US012809402B2

(12) United States Patent
Kreines et al.

(10) Patent No.: US 12,809,402 B2
(45) Date of Patent: Nov. 24, 2026

(54) REDUNDANT VEHICLE TRAJECTORY VALIDATION

(71) Applicant: Mobileye Vision Technologies Ltd., Jerusalem (IL)

(72) Inventors: Alexander Kreines, Jerusalem (IL); Almog Shany, Hanaton (IL); Abraham Hendler, Tel Aviv (IL); Yuval Elenblum, Tel Aviv (IL); Moshe Levi, Giv'at Ze'ev (IL); Joseph Hollander, Ramat-Gan (IL); Itay Daybog, Jerusalem (IL)

(73) Assignee: Mobileye Vision Technologies Ltd., Jerusalem (IL)

( * ) Notice: Subject to any disclaimer, the term of this patent is extended or adjusted under 35 U.S.C. 154(b) by 63 days.

(21) Appl. No.: 19/070,761

(22) Filed: Mar. 5, 2025

(65) Prior Publication Data

US 2025/0284298 A1 Sep. 11, 2025

Related U.S. Application Data

(60) Provisional application No. 63/563,710, filed on Mar. 11, 2024.

(51) Int. Cl.
*G05D 1/87* (2024.01)
*B60W 30/09* (2012.01)
(Continued)

(52) U.S. Cl.
CPC ............... *G05D 1/87* (2024.01); *B60W 30/09* (2013.01); *B60W 30/12* (2013.01); (Continued)

(58) Field of Classification Search
CPC ........ G05D 1/87; B60W 30/09; B60W 30/12; B60W 50/023; B60W 60/0011; (Continued)

(56) References Cited

U.S. PATENT DOCUMENTS

| | | | | |
|---|---|---|---|---|
| 10,210,406 B2 * | 2/2019 | Huang | ...................... | G01S 5/16 |
| 2009/0157268 A1 * | 6/2009 | Chiba | ...................... | G08G 1/16 701/99 |
| 2009/0268946 A1 * | 10/2009 | Zhang | .................... | G06V 20/56 348/148 |
| 2015/0110344 A1 * | 4/2015 | Okumura | ............. | G06V 20/588 382/103 |

(Continued)

FOREIGN PATENT DOCUMENTS

WO 2023244982 A1 12/2023

OTHER PUBLICATIONS

Oct. 6, 2025 (UK) Search Report—App. 2503520.5.
Mar. 13, 2026 (NL) Search Report and Written Opinion—App. 2039918.

*Primary Examiner* — Lindsay M Low
*Assistant Examiner* — Brian R Kirby
(74) *Attorney, Agent, or Firm* — Banner & Witcoff, Ltd.

(57) ABSTRACT

Techniques are disclosed for validating a vehicle trajectory using redundancy in hardware and software components. A computed vehicle trajectory may be validated independently via two separate SoCs by projecting the 3D computed vehicle trajectory onto a 2D image acquired by a vehicle camera. Each SoC may perform an independent trajectory validation with the use of a trained machine learning model such as a deep neural network (DNN). The DNNs implemented by each SoC may perform trajectory validation using a separate set of camera inputs for the mapping and validation process. The vehicle implements the vehicle trajectory for control functions only when the trajectory is validated by both SoC trajectory validators, thus providing a robust trajectory validation process that complies with regulatory requirements such as Automotive Safety Integrity Level (ASIL) level D.

20 Claims, 11 Drawing Sheets

400

(51) Int. Cl.

| | |
|---|---|
| ***B60W 30/12*** | (2020.01) |
| ***B60W 50/023*** | (2012.01) |
| ***B60W 60/00*** | (2020.01) |
| ***G06V 10/82*** | (2022.01) |

(52) U.S. Cl.
CPC ...... *B60W 50/023* (2013.01); *B60W 60/0011* (2020.02); *B60W 60/0015* (2020.02); *G06V 10/82* (2022.01); *B60W 2720/24* (2013.01)

(58) Field of Classification Search
CPC ......... B60W 60/0015; B60W 2720/24; B60W 2420/403; G06V 10/82; G06V 20/588; G01C 21/3407; G08G 1/0112; G08G 1/0133; G08G 1/0141; G08G 1/04; G08G 1/167
USPC ................................................ 701/23, 25, 28
See application file for complete search history.

(56) References Cited

U.S. PATENT DOCUMENTS

| | | | | |
|---|---|---|---|---|
| 2017/0193338 | A1* | 7/2017 | Huberman | G06V 10/82 |
| 2018/0024562 | A1* | 1/2018 | Bellaiche | G06V 20/588 701/26 |
| 2018/0136666 | A1* | 5/2018 | Max | B62D 15/0285 |
| 2018/0156626 | A1* | 6/2018 | Kang | G06V 20/588 |
| 2019/0243372 | A1* | 8/2019 | Huval | B60W 60/001 |
| 2020/0180612 | A1* | 6/2020 | Finelt | B60W 30/09 |
| 2020/0257301 | A1* | 8/2020 | Weiser | B60W 30/0956 |
| 2021/0101624 | A1 | 4/2021 | Philbin et al. | |
| 2021/0103285 | A1 | 4/2021 | Philbin et al. | |
| 2021/0146939 | A1* | 5/2021 | Sari | G01S 7/40 |
| 2022/0105930 | A1* | 4/2022 | Kurakami | B60W 50/0097 |
| 2022/0281478 | A1* | 9/2022 | Shedge | B60W 60/0015 |
| 2024/0017741 | A1 | 1/2024 | Sandberg et al. | |
| 2024/0199072 | A1* | 6/2024 | Edling | B60W 50/00 |

* cited by examiner

100

300

700

| | | Trajectory SoC 404 | Trajectory Validator_A (Based on Main) SoC 402 | Trajectory Validator_B (Based on Front Side) SoC 404 |
|---|---|---|---|---|
| Failures | Front Main | ✗ | ✗ | ✓ |
| | Front Narrow | ✗ | ✓ | ✓ |
| | FL Camera | ✗ | ✓ | ✗ |
| | FR Camera | ✗ | ✓ | ✗ |
| | RL camera | ✗ | ✓ | ✓ |
| | RR camera | ✗ | ✓ | ✓ |
| | Rear Camera | ✗ | ✓ | ✓ |
| | Parking Cameras | ✗ | ✓ | ✓ |
| | | | | |
| | SoC 404 | ✗ | ✓ | ✗ |
| | SoC 402 | ✗ | ✗ | ✓ |
| | Trajectory (control Path) | ✗ | ✓ | ✓ |
| | Trajectory Validator_A | ✓ | ✗ | ✓ |
| | Trajectory Validator_B | ✓ | ✓ | ✗ |

FIG. 7

REDUNDANT VEHICLE TRAJECTORY VALIDATION

CROSS-REFERENCE TO RELATED APPLICATIONS

This application claims priority to U.S. provisional application No. 63,563,710, filed on Mar. 11, 2024, the contents of which are incorporated herein by reference in their entirety.

TECHNICAL FIELD

This disclosure generally relates to techniques used for performing redundant verification of computed vehicle trajectories used in conjunction with autonomous vehicle and semi-autonomous vehicle control-based architectures and, more particularly, to the implementation of both redundant algorithms and hardware components to verify vehicle trajectories.

BACKGROUND

Examining the established six levels of driving automation reveals that the largest gap in those levels is between Level 2 and Level 3. This is essentially the crossover from driver assist to some level of autonomy. In the jump between these two levels, liability thus shifts from the driver to the system. Thus, the term L2+ refers to a scenario that is still within the driver-assist realm, but incorporates another layer on top of the traditional Advanced Driving Assistance System (ADAS) features. L2+ functions by heightening a vehicle's understanding of its path by taking data collected from the front ADAS camera and combining it with other data, which may be referred to herein as roadbook map data or Road Experience Management (REM) data, and which represents a crowdsourced high-precision map designed to help autonomous vehicles (A Vs) drive. The L2+ category enhances L1-L2 driver assistance safety features with location intelligence, providing greater utility to drivers in all driving environments. With REM maps on-board, vehicles utilize crowdsourced data to augment their sensing, reduce uncertainties, enhance advanced driving maneuvers, and enable their use in more complex driving settings.

Thus, L2+ driving assistance features include the computation of vehicle trajectories that may be followed by the vehicle as part of ADAS functionality. For example, the driver may take his hands off the wheel and/or feet off the pedals, but remains liable for the overall control of the vehicle. Thus, the assumption is that a driver is maintaining focus during L2+ driving assistance and is able to intervene to correct the maneuver in the event that a computed vehicle trajectory is incorrect, which may result in the vehicle veering off the road (e.g. crossing over a defined road edge boundary) or into oncoming traffic (e.g. crossing over into an oncoming traffic lane).

In such cases, a hands on request (HOR) (also referred to herein as a "takeover request" (TOR)) is signaled to the driver via in-vehicle alert systems, which instruct the driver that manual intervention is needed. But the introduction of hands-off L2+ driving for various driving scenarios, which may include both rural and urban roads and highway driving, increases the criticality of wrong steering, since it takes longer for a driver to interact and respond for steering when his hands are off the steering wheel (between 1.5 and 2.5 sec vs. ~0.5-1 sec). Furthermore, rural roads, which tend to be physically separated by a barrier or additional space, provide different challenges compared to urban scenarios in which such a physical separation between lanes of different driving directions may not be present.

With this in mind, it is noted that certain automotive risk classification requirements need to be met for L2+ driving scenarios in both urban and rural settings. For instance, Automotive Safety Integrity Level (ASIL) level D (or simply ASIL-D) is an automotive risk classification that is part of a larger ISO standard ISO 26262, which looks at the functional safety requirements for all of the different electrical and electronics systems in a vehicle. In accordance with the ASIL D requirements, false steering needs to be avoided for rural and urban scenarios, as well as for highway driving, which would result in the vehicle moving beyond the road edge or into oncoming lanes (when there is an object in a danger zone). Furthermore, conventional techniques cannot use control limiters on automotive-grade microcontrollers (MCUs) to mitigate these hazards since the steering cannot be limited for urban roads.

BRIEF DESCRIPTION OF THE DRAWINGS/FIGURES

The accompanying drawings, which are incorporated herein and form a part of the specification, illustrate the aspects of the present disclosure and, together with the description, and further serve to explain the principles of the aspects and to enable a person skilled in the pertinent art to make and use the aspects.

FIG. 7 illustrates a table of example detected failure modes with respect to the trajectory validation process, in accordance with one or more aspects of the present disclosure;

Figure 1:
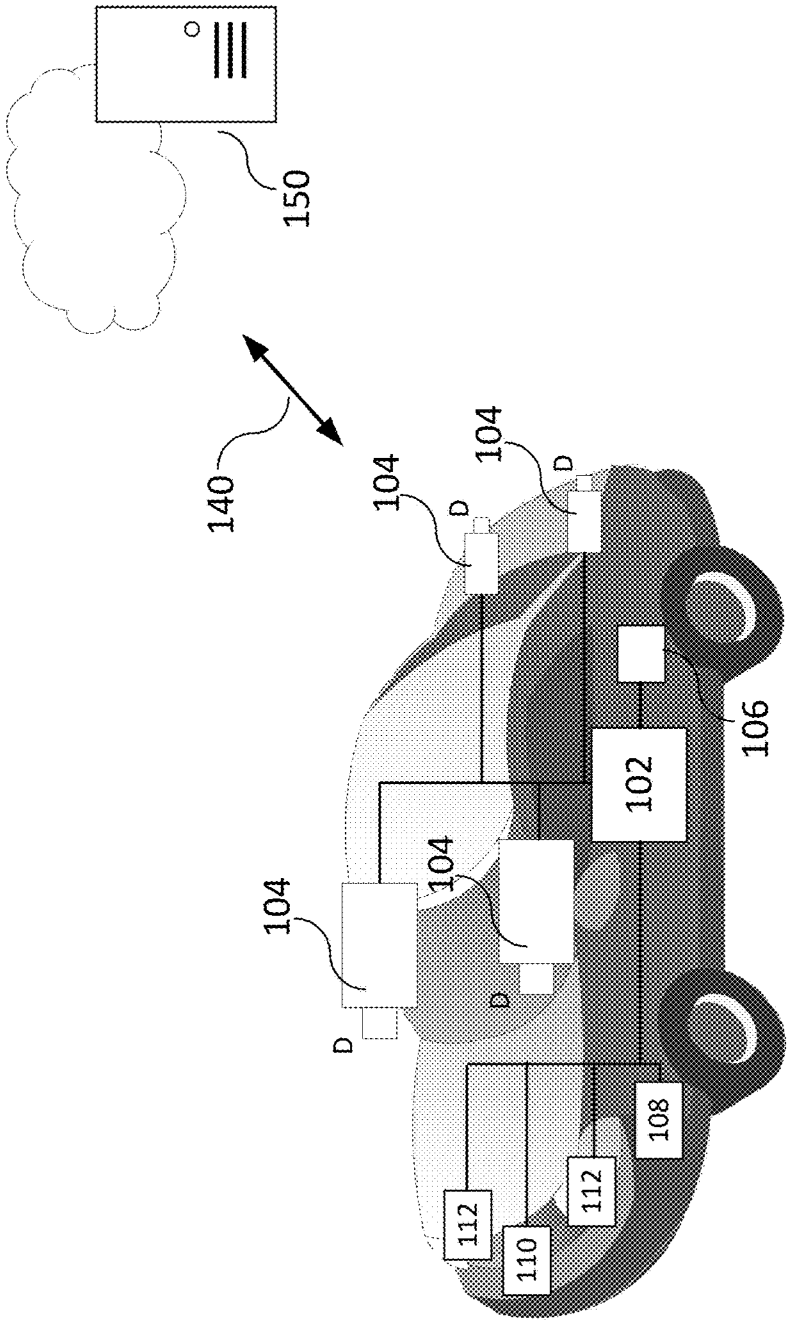
FIG. 1 illustrates an example vehicle in accordance with one or more aspects of the present disclosure.

The exemplary aspects of the present disclosure will be described with reference to the accompanying drawings.

The drawing in which an element first appears is typically indicated by the leftmost digit(s) in the corresponding reference number.

DETAILED DESCRIPTION

In the following description, numerous specific details are set forth in order to provide a thorough understanding of the aspects of the present disclosure. However, it will be apparent to those skilled in the art that the aspects, including structures, systems, and methods, may be practiced without these specific details. The description and representation herein are the common means used by those experienced or skilled in the art to most effectively convey the substance of their work to others skilled in the art. In other instances, well-known methods, procedures, components, and circuitry have not been described in detail to avoid unnecessarily obscuring aspects of the disclosure.

I. Autonomous Vehicle Architecture and Operation

FIG. 1 shows an example vehicle 100 including a safety system 200 (see also FIG. 2) in accordance with various aspects of the present disclosure. The vehicle 100 and the safety system 200 are exemplary in nature, and may thus be simplified for explanatory purposes. Locations of elements and relational distances (as discussed herein, the Figures are not to scale) are provided by way of example and not limitation. The safety system 200 may include various components depending on the requirements of a particular implementation and/or application, and may facilitate the navigation and/or control of the vehicle 100. The vehicle 100 may be an autonomous vehicle (AV), which may include any level of automation (e.g. levels 0-5), which includes no automation or full automation (level 5). The vehicle 100 may implement the safety system 200 as part of any suitable type of autonomous or driver assistance control system, including AV and/or advanced driver-assistance system (ADAS), for instance. The safety system 200 may include one or more components that are integrated as part of the vehicle 100 during manufacture, part of an add-on or aftermarket device, or combinations of these. Thus, the various components of the safety system 200 as shown in FIG. 2 may be integrated as part of the vehicle's systems and/or part of an aftermarket system that is installed in the vehicle 100.

The one or more processors 102 may be integrated with or separate from an electronic control unit (ECU) of the vehicle 100 or an engine control unit of the vehicle 100, which may be considered herein as a specialized type of an electronic control unit. The safety system 200 may generate data to control (or assist to control) the ECU and/or other components of the vehicle 100 to directly or indirectly control the driving of the vehicle 100. However, the aspects described herein are not limited to implementation within autonomous or semi-autonomous vehicles, as these are provided by way of example. The aspects described herein may be implemented as part of any suitable type of vehicle that may be capable of travelling with or without any suitable level of human assistance in a particular driving environment. Therefore, one or more of the various vehicle components such as those discussed herein with reference to FIG. 2 for instance, may be implemented as part of a standard vehicle (i.e. a vehicle not using autonomous driving functions), a fully autonomous vehicle, and/or a semi-autonomous vehicle, in various aspects. In aspects implemented as part of a standard vehicle, it is understood that the safety system 200 may perform alternate functions, and thus in accordance with such aspects the safety system 200 may alternatively represent any suitable type of system that may be implemented by a standard vehicle without necessarily utilizing autonomous or semi-autonomous control related functions.

Figure 2:
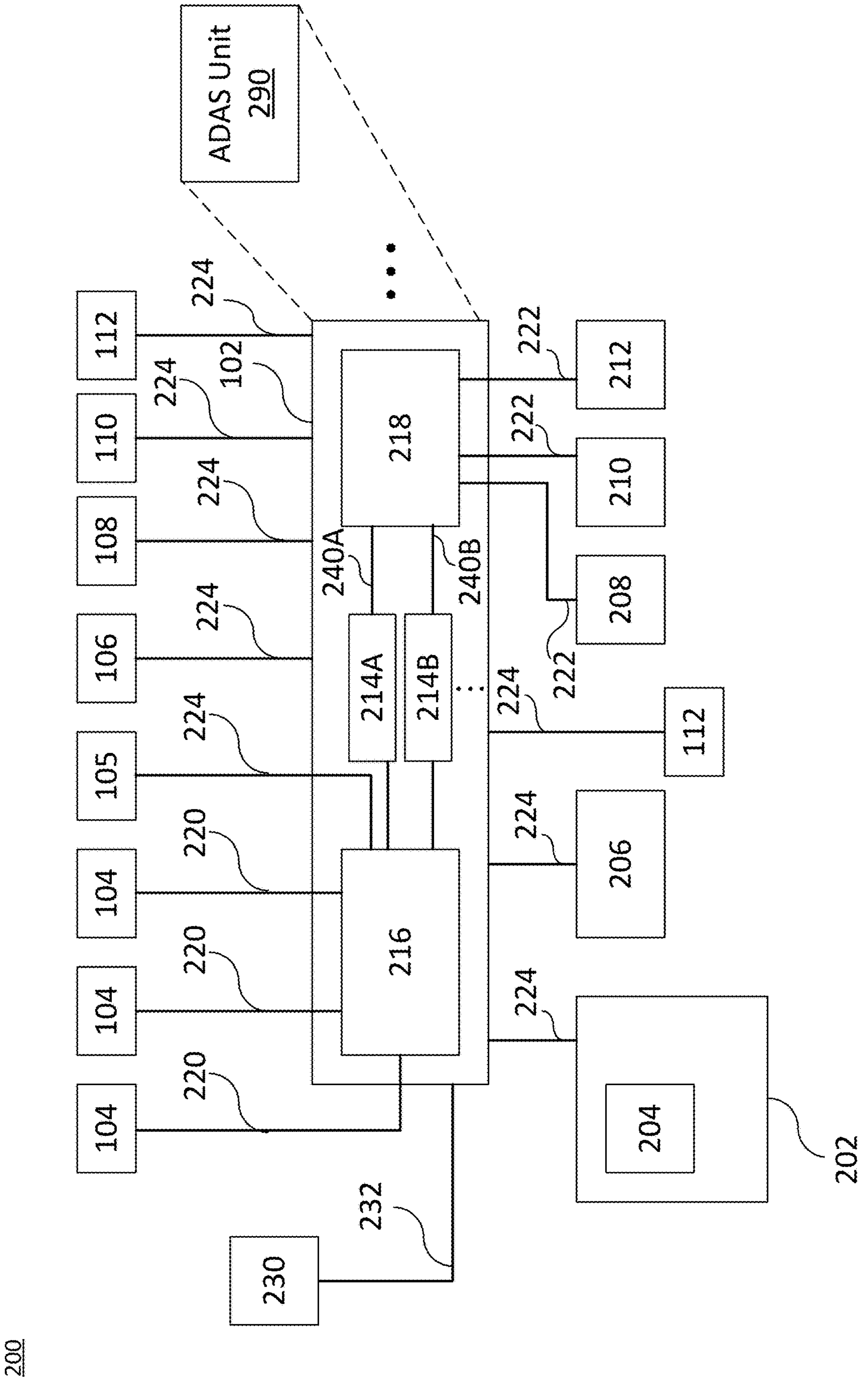
FIG. 2 illustrates various example electronic components of a safety system of a vehicle, in accordance with one or more aspects of the present disclosure.

Regardless of the particular implementation of the vehicle 100 and the accompanying safety system 200 as shown in FIG. 1 and FIG. 2, the safety system 200 may include one or more processors 102, one or more image acquisition devices 104 such as, e.g., one or more vehicle cameras or any other suitable sensor configured to perform image acquisition over any suitable range of wavelengths, one or more position sensors 106, which may be implemented as a position and/or location-identifying system such as a Global Navigation Satellite System (GNSS), e.g., a Global Positioning System (GPS), one or more memories 202, one or more map databases 204, one or more user interfaces 206 (such as, e.g., a display, a touch screen, a microphone, a loudspeaker, one or more buttons and/or switches, and the like), and one or more wireless transceivers 208, 210, 212. Additionally or alternatively, the one or more user interfaces 206 may be identified with other components in communication with the safety system 200, such as one or more components of an ADAS unit, an AV system, etc., as further discussed herein.

The wireless transceivers 208, 210, 212 may be configured to operate in accordance with any suitable number and/or type of desired radio communication protocols or standards. By way of example, a wireless transceiver (e.g., a first wireless transceiver 208) may be configured in accordance with a Short-Range mobile radio communication standard such as e.g. Bluetooth, Zigbee, and the like. As another example, a wireless transceiver (e.g., a second wireless transceiver 210) may be configured in accordance with a Medium or Wide Range mobile radio communication standard such as e.g. a 3G (e.g. Universal Mobile Telecommunications System—UMTS), a 4G (e.g. Long Term Evolution—LTE), or a 5G mobile radio communication standard in accordance with corresponding 3GPP (3rd Generation Partnership Project) standards, the most recent version at the time of this writing being the 3GPP Release 16 (2020).

As a further example, a wireless transceiver (e.g., a third wireless transceiver 212) may be configured in accordance with a Wireless Local Area Network communication protocol or standard such as e.g. in accordance with IEEE 802.11 Working Group Standards, the most recent version at the time of this writing being IEEE Std 802.11™-2020, published Feb. 26, 2021 (e.g. 802.11, 802.11a, 802.11b, 802.11g, 802.11n, 802.11p, 802.11-12, 802.11ac, 802.11ad, 802.11ah, 802.11ax, 802.11ay, and the like). The one or more wireless transceivers 208, 210, 212 may be configured to transmit signals via an antenna system (not shown) using an air interface. As additional examples, one or more of the transceivers 208, 210, 212 may be configured to implement one or more vehicle to everything (V2X) communication protocols, which may include vehicle to vehicle (V2V), vehicle to infrastructure (V2I), vehicle to network (V2N), vehicle to pedestrian (V2P), vehicle to device (V2D), vehicle to grid (V2G), and any other suitable communication protocols.

One or more of the wireless transceivers 208, 210, 212 may additionally or alternatively be configured to enable communications between the vehicle 100 and one or more other remote computing devices via one or more wireless links 140. This may include, for instance, communications with the remote computing system 150 as shown in FIG. 1. The example shown FIG. 1 illustrates such a remote computing system 150 as a cloud computing system, although this is by way of example and not limitation, and the remote computing system 150 may be implemented in accordance with any suitable architecture and/or network and may constitute one or several physical computers, servers, processors, etc. that comprise such a system. As another example, the remote computing system 150 may be implemented as an edge computing system and/or network.

The one or more processors 102 may implement any suitable type of processing circuitry, other suitable circuitry, memory, etc., and utilize any suitable type of architecture. The one or more processors 102 may be configured as a controller implemented by the vehicle 100 to perform various vehicle control functions, navigational functions, etc. For example, the one or more processors 102 may be configured to function as a controller for the vehicle 100 to analyze sensor data and received communications, to calculate specific actions for the vehicle 100 to execute for navigation and/or control of the vehicle 100, and to cause the corresponding action to be executed, which may be in accordance with an AV or ADAS system, for instance.

Moreover, one or more of the processors 214A, 214B, 216, and/or 218 of the one or more processors 102 may be configured to work in cooperation with one another and/or with other components of the vehicle 100 to collect information about the environment (e.g., sensor data, such as images, depth information (for a Lidar for example), etc.). In this context, one or more of the processors 214A, 214B, 216, and/or 218 of the one or more processors 102 may be referred to as "processors." The processors can thus be implemented (independently or together) to create mapping information from the harvested data, e.g., Road Segment Data (RSD) information that may be used for Road Experience Management (REM) mapping technology, the details of which are further described below. As another example, the processors can be implemented to process mapping information (e.g. roadbook information used for REM mapping technology) received from remote servers over a wireless communication link (e.g. link 140) to localize the vehicle 100 on an AV map, which can be used by the processors to control the vehicle 100.

The one or more processors 102 may include one or more application processors 214A, 214B, an image processor 216, a communication processor 218, and may additionally or alternatively include any other suitable processing device, circuitry, components, etc. not shown in the Figures for purposes of brevity. Similarly, image acquisition devices 104 may include any suitable number of image acquisition devices and components depending on the requirements of a particular application. Image acquisition devices 104 may include one or more image capture devices (e.g., cameras, charge coupling devices (CCDs), or any other type of image sensor). The safety system 200 may also include a data interface communicatively connecting the one or more processors 102 to the one or more image acquisition devices 104. For example, a first data interface may include any wired and/or wireless first link 220, or first links 220 for transmitting image data acquired by the one or more image acquisition devices 104 to the one or more processors 102, e.g., to the image processor 216.

The wireless transceivers 208, 210, 212 may be coupled to the one or more processors 102, e.g., to the communication processor 218, e.g., via a second data interface. The second data interface may include any wired and/or wireless second link 222 or second links 222 for transmitting radio transmitted data acquired by wireless transceivers 208, 210, 212 to the one or more processors 102, e.g., to the communication processor 218. Such transmissions may also include communications (one-way or two-way) between the vehicle 100 and one or more other (target) vehicles in an environment of the vehicle 100 (e.g., to facilitate coordination of navigation of the vehicle 100 in view of or together with other (target) vehicles in the environment of the vehicle 100), or even a broadcast transmission to unspecified recipients in a vicinity of the transmitting vehicle 100.

The memories 202, as well as the one or more user interfaces 206, may be coupled to each of the one or more processors 102, e.g., via a third data interface. The third data interface may include any wired and/or wireless third link 224 or third links 224. Furthermore, the position sensors 106 may be coupled to each of the one or more processors 102, e.g., via the third data interface.

Each processor 214A, 214B, 216, 218 of the one or more processors 102 may be implemented as any suitable number and/or type of hardware-based processing devices (e.g. processing circuitry), and may collectively, i.e. with the one or more processors 102 form one or more types of controllers as discussed herein. The architecture shown in FIG. 2 is provided for ease of explanation and as an example, and the vehicle 100 may include any suitable number of the one or more processors 102, each of which may be similarly configured to utilize data received via the various interfaces and to perform one or more specific tasks.

For example, the one or more processors 102 may form a controller that is configured to perform various control-related functions of the vehicle 100 such as the calculation and execution of a specific vehicle following speed, velocity, acceleration, braking, steering, trajectory, etc. As another example, the vehicle 100 may, in addition to or as an alternative to the one or more processors 102, implement other processors (not shown) that may form a different type of controller that is configured to perform additional or alternative types of control-related functions. Each controller may be responsible for controlling specific subsystems and/or controls associated with the vehicle 100. In accordance with such aspects, each controller may receive data from respectively coupled components as shown in FIG. 2 via respective interfaces (e.g. 220, 222, 224, 232, etc.), with the wireless transceivers 208, 210, and/or 212 providing data to the respective controller via the second links 222, which function as communication interfaces between the respective wireless transceivers 208, 210, and/or 212 and each respective controller in this example.

To provide another example, the application processors 214A, 214B may individually represent respective controllers that work in conjunction with the one or more processors 102 to perform specific control-related tasks. For instance, the application processor 214A may be implemented as a first controller, whereas the application processor 214B may be implemented as a second and different type of controller that is configured to perform other types of tasks as discussed further herein. In accordance with such aspects, the one or more processors 102 may receive data from respectively coupled components as shown in FIG. 2 via the various interfaces 220, 222, 224, 232, etc., and the communication processor 218 may provide communication data received from other vehicles (or to be transmitted to other vehicles) to each controller via the respectively coupled links 240A, 240B, which function as communication interfaces between the respective application processors 214A, 214B and the communication processors 218 in this example. Of course, the application processors 214A, 214B may perform other functions in addition to or as an alternative to control-based functions, such as the various processing functions discussed herein, providing ADAS alerts, providing HORs, etc.

The one or more processors 102 may additionally be implemented to communicate with any other suitable components of the vehicle 100 to determine a state of the vehicle while driving or at any other suitable time, which may comprise an analysis of data representative of a vehicle status. For instance, the vehicle 100 may include one or more vehicle computers, sensors, ECUs, interfaces, etc., which may collectively be referred to as vehicle components 230 as shown in FIG. 2. The one or more processors 102 are configured to communicate with the vehicle components 230 via an additional data interface 232, which may represent any suitable type of links and operate in accordance with any suitable communication protocol (e.g. CAN bus communications). Using the data received via the data interface 232, the one or more processors 102 may determine any suitable type of vehicle status information such as the current drive gear, current engine speed, acceleration capabilities of the vehicle 100, etc. As another example, various metrics used to control the speed, acceleration, braking, steering, etc. may be received via the vehicle components 230, which may include receiving any suitable type of signals that are indicative of such metrics or varying degrees of how such metrics vary over time (e.g. brake force, wheel angle, reverse gear, etc.).

The one or more processors 102 may include any suitable number of other processors 214A, 214B, 216, 218, each of which may comprise processing circuitry such as sub-processors, a microprocessor, pre-processors (such as an image pre-processor), graphics processors, a central processing unit (CPU), support circuits, digital signal processors, integrated circuits, memory, or any other types of devices suitable for running applications and for data processing (e.g. image processing, audio processing, etc.) and analysis and/or to enable vehicle control to be functionally realized. In some aspects, each processor 214A, 214B, 216, 218 may include any suitable type of single or multi-core processor, microcontroller, central processing unit, etc. These processor types may each include multiple processing units with local memory and instruction sets. Such processors may include video inputs for receiving image data from multiple image sensors, and may also include video out capabilities.

Any of the processors 214A, 214B, 216, 218 disclosed herein may be configured to perform certain functions in accordance with program instructions, which may be stored in the local memory of each respective processor 214A, 214B, 216, 218, or accessed via another memory that is part of the safety system 200 or external to the safety system 200. This memory may include the one or more memories 202. Regardless of the particular type and location of memory, the memory may store software and/or executable (i.e. computer-readable) instructions that, when executed by a relevant processor (e.g., by the one or more processors 102, one or more of the processors 214A, 214B, 216, 218, etc.), controls the operation of the safety system 200 and may perform other functions such those identified with the aspects described in further detail below.

A relevant memory accessed by the one or more processors 214A, 214B, 216, 218 (e.g. the one or more memories 202) may also store one or more databases and image processing software, as well as a trained system, such as a neural network, or a deep neural network (DNN), for example, that may be utilized to perform the tasks in accordance with any of the aspects as discussed herein. A relevant memory accessed by the one or more processors 214A, 214B, 216, 218 (e.g. the one or more memories 202) may be implemented as any suitable number and/or type of non-transitory computer-readable medium such as random-access memories, read only memories, flash memories, disk drives, optical storage, tape storage, removable storage, or any other suitable types of storage.

The components associated with the safety system 200 as shown in FIG. 2 are illustrated for case of explanation and by way of example and not limitation. The safety system 200 may include additional, fewer, or alternate components as shown and discussed herein with reference to FIG. 2. Moreover, one or more components of the safety system 200 may be integrated or otherwise combined into common processing circuitry components or separated from those shown in FIG. 2 to form distinct and separate components. For instance, one or more of the components of the safety system 200 may be integrated with one another on a common die or chip. As an illustrative example, the one or more processors 102 and the relevant memory accessed by the one or more processors 214A, 214B, 216, 218 (e.g. the one or more memories 202) may be integrated on a common chip, die, package, etc., and together comprise a controller or system configured to perform one or more specific tasks or functions.

In some aspects, the safety system 200 may further include components such as a speed sensor 108 (e.g. a speedometer) for measuring a speed of the vehicle 100. The safety system 200 may also include one or more inertial measurement unit (IMU) sensors such as e.g. accelerometers, magnetometers, and/or gyroscopes (either single axis or multiaxis) for measuring accelerations of the vehicle 100 along one or more axes, and additionally or alternatively one or more gyro sensors, which may be implemented for instance to calculate the vehicle's ego-motion as discussed herein, alone or in combination with other suitable vehicle sensors. These IMU sensors may, for example, be part of the position sensors 105 as discussed herein. The safety system 200 may further include additional sensors or different sensor types such as an ultrasonic sensor, a thermal sensor, one or more radar sensors 110, one or more LIDAR sensors 112 (which may be integrated in the head lamps of the vehicle 100), digital compasses, and the like. The radar sensors 110 and/or the LIDAR sensors 112 may be configured to provide pre-processed sensor data, such as radar target lists or LIDAR target lists. The third data interface (e.g., one or more links 224) may couple the speed sensor 108, the one or more radar sensors 110, and the one or more LIDAR sensors 112 to at least one of the one or more processors 102.

II. Autonomous Vehicle (AV) Map Data and Road Experience Management (REM)

Data referred to as REM map data (or alternatively as roadbook map data), may also be stored in a relevant memory accessed by the one or more processors 214A, 214B, 216, 218 (e.g. the one or more memories 202) or in any suitable location and/or format, such as in a local or cloud-based database, accessed via communications between the vehicle and one or more external components (e.g. via the transceivers 208, 210, 212), etc. It is noted that although referred to herein as "AV map data," the REM map data may be implemented in any suitable vehicle platform, which may include vehicles having any suitable level of automation (e.g. levels 0-5), as noted above.

Regardless of where the AV map data is stored and/or accessed, the AV map data may include a geographic location of known landmarks that are readily identifiable in the navigated environment in which the vehicle 100 travels. The location of the landmarks may be generated from a historical accumulation from other vehicles driving on the same road that collect data regarding the appearance and/or location of landmarks (e.g. "crowd sourcing"). Thus, each landmark may be correlated to a set of predetermined geographic coordinates that has already been established. Therefore, in addition to the use of location-based sensors such as GNSS, the database of landmarks provided by the AV map data enables the vehicle 100 to identify the landmarks using the one or more image acquisition devices 104. Once identified, the vehicle 100 may implement other sensors such as LIDAR, accelerometers, speedometers, etc. or images from the image acquisitions device 104, to evaluate the position and location of the vehicle 100 with respect to the identified landmark positions.

Furthermore, and as noted above, the vehicle 100 may determine its own motion, which is referred to as "ego-motion." Ego-motion is generally used for computer vision algorithms and other similar algorithms to represent the motion of a vehicle camera across a plurality of frames, which provides a baseline (i.e. a spatial relationship) that can be used to compute the 3D structure of a scene from respective images. The vehicle 100 may analyze the ego-motion to determine the position and orientation of the vehicle 100 with respect to the identified known landmarks. Because the landmarks are identified with predetermined geographic coordinates, the vehicle 100 may determine its position on a map based upon a determination of its position with respect to identified landmarks using the landmark-correlated geographic coordinates. Doing so provides distinct advantages that combine the benefits of smaller scale position tracking with the reliability of GNSS positioning systems while avoiding the disadvantages of both systems. It is further noted that the analysis of ego motion in this manner is one example of an algorithm that may be implemented with monocular imaging to determine a relationship between a vehicle's location and the known location of known landmark(s), thus assisting the vehicle to localize itself. However, ego-motion is not necessary or relevant for other types of technologies, and therefore is not essential for localizing using monocular imaging. Thus, in accordance with the aspects as described herein, the vehicle 100 may leverage any suitable type of localization technology.

Thus, the AV map data is generally constructed as part of a series of steps, which may involve any suitable number of vehicles that opt into the data collection process. For instance, Road Segment Data (RSD) is collected as part of a harvesting step. As each vehicle collects data, the data is classified into tagged data points, which are then transmitted to the cloud or to another suitable external location. A suitable computing device (e.g. a cloud server) then analyzes the data points from individual drives on the same road, and aggregates and aligns these data points with one another. After alignment has been performed, the data points are used to define a precise outline of the road infrastructure. Next, relevant semantics are identified that enable vehicles to understand the immediate driving environment, i.e. features and objects are defined that are linked to the classified data points. The features and objects defined in this manner may include, for instance, traffic lights, road arrows, signs, road edges, drivable paths, lane split points, stop lines, lane markings, etc. to the driving environment so that a vehicle may readily identify these features and objects using the AV map data. This information is then compiled into a Roadbook Map, which constitutes a bank of driving paths, semantic road information such as features and objects, and aggregated driving behavior.

A map database 204, which may be stored as part of the one or more memories 202 or accessed via the remote computing system 150 via the link(s) 140, for instance, may include any suitable type of database configured to store (digital) map data for the vehicle 100, e.g., for the safety system 200. The one or more processors 102 may download information to the map database 204 over a wired or wireless data connection (e.g. the link(s) 140) using a suitable communication network (e.g., over a cellular network and/or the Internet, etc.). Again, the map database 204 may store the AV map data, which includes data relating to the position, in a reference coordinate system, of various landmarks such as objects and other items of information, including roads, water features, geographic features, businesses, points of interest, restaurants, gas stations, etc.

The map database 204 may thus store, as part of the AV map data, not only the locations of such landmarks, but also descriptors relating to those landmarks, including, for example, names associated with any of the stored features, and may also store information relating to details of the items such as a precise position and orientation of items. In some cases, the AV map data may store a sparse data model including polynomial representations of certain road features (e.g., lane markings) or target trajectories for the vehicle 100. The AV map data may also include stored representations of various recognized landmarks that may be provided to determine or update a known position of the vehicle 100 with respect to a target trajectory. The landmark representations may include data fields such as landmark type, landmark location, etc., among other potential identifiers. The AV map data may also include non-semantic features including point clouds of certain objects or features in the environment, and feature point and descriptors.

The map database 204 may be augmented with data in addition to the AV map data, and/or the map database 204 and/or the AV map data may reside partially or entirely as part of the remote computing system 150. As discussed herein, the location of known landmarks and map database information, which may be stored in the map database 204 and/or the remote computing system 150, may form what is again referred to herein as "AV map data," "REM map data" or "Roadbook Map data." The one or more processors 102 may process sensory information (such as images, radar signals, depth information from LIDAR or stereo processing of two or more images) of the environment of the vehicle 100 together with position information, such as GPS coordinates, the vehicle's ego-motion, etc., to determine a current location, position, and/or orientation of the vehicle 100 relative to the known landmarks by using information contained in the AV map. The determination of the vehicle's location may thus be refined in this manner. Certain aspects of this technology may additionally or alternatively be included in a localization technology such as a mapping and routing model.

III. Safety Driving Model

Furthermore, the safety system 200 may implement a safety driving model or SDM, which may be utilized and/or executed as part of the ADAS system as discussed herein. By way of example, the safety system 200 may include (e.g. as part of a driving policy) a computer implementation of a formal model such as a safety driving model. A safety driving model may include an implementation of a mathematical model formalizing an interpretation of applicable laws, standards, policies, etc. that are applicable to self-driving (e.g., ground) vehicles. In some embodiments, the SDM may comprise a standardized driving policy such as the Responsibility Sensitivity Safety (RSS) model. However, the embodiments are not limited to this particular example, and the SDM may be implemented using any suitable driving policy model that defines various safety parameters that the AV should comply with to facilitate safe driving.

For instance, the SDM may be designed to achieve, e.g., three goals: first, the interpretation of the law should be sound in the sense that it complies with how humans interpret the law; second, the interpretation should lead to a useful driving policy, meaning it will lead to an agile driving policy rather than an overly-defensive driving which inevitably would confuse other human drivers and will block traffic, and in turn limit the scalability of system deployment; and third, the interpretation should be efficiently verifiable in the sense that it can be rigorously proven that the self-driving (autonomous) vehicle correctly implements the interpretation of the law. An implementation in a host vehicle of a safety driving model (e.g. the vehicle 100) may be or include an implementation of a mathematical model for safety assurance that enables identification and performance of proper responses to dangerous situations such that self-perpetrated accidents can be avoided.

A safety driving model may implement logic to apply driving behavior rules such as the following five rules:

Do not hit someone from behind.

Do not cut-in recklessly.

Right-of-way is given, not taken.

Be careful of areas with limited visibility.

If you can avoid an accident without causing another one, you must do it.

It is to be noted that these rules are not limiting and not exclusive, and can be amended in various aspects as desired. The rules thus represent a social driving "contract" that might be different depending upon the region, and may also develop over time. While these five rules are currently applicable in most countries, the rules may not be complete or the same in each region or country and may be amended.

As described above, the vehicle 100 may include the safety system 200 as also described with reference to FIG. 2. Thus, the safety system 200 may generate data to control or assist to control the ECU of the vehicle 100 and/or other components of the vehicle 100 to directly or indirectly navigate and/or control the driving operation of the vehicle 100, such navigation including driving the vehicle 100 or other suitable operations as further discussed herein. This navigation may optionally include adjusting one or more SDM parameters, which may occur in response to the detection of any suitable type of feedback that is obtained via image processing, sensor measurements, etc. The feedback used for this purpose may be collectively referred to herein as "environmental data measurements" and include any suitable type of data that identifies a state associated with the external environment, the vehicle occupants, the vehicle 100, and/or the cabin environment of the vehicle 100, etc.

For instance, the environmental data measurements may be used to identify a longitudinal and/or lateral distance between the vehicle 100 and other vehicles, the presence of objects in the road, the location of hazards, etc. The environmental data measurements may be obtained and/or be the result of an analysis of data acquired via any suitable components of the vehicle 100, such as the one or more image acquisition devices 104, the one or more position sensors 105, the position sensors 106, the speed sensor 108, the one or more radar sensors 110, the one or more LIDAR sensors 112, etc. To provide an illustrative example, the environmental data may be used to generate an environmental model based upon any suitable combination of the environmental data measurements. Thus, the vehicle 100 may utilize the tasks performed via trained model(s) to perform various navigation-related operations within the framework of the driving policy model.

The navigation-related operation may be performed, for instance, by generating the environmental model and using the driving policy model in conjunction with the environmental model to determine an action to be carried out by the vehicle. That is, the driving policy model may be applied based upon the environmental model to determine one or more actions (e.g. navigation-related operations) to be carried out by the vehicle. The SDM may represent the driving policy model or, alternatively, may be used in conjunction (as part of or as an added layer) with the driving policy model to assure a safety of an action to be carried out by the vehicle at any given instant. For example, the ADAS may leverage or reference the SDM parameters defined by the safety driving model to determine navigation-related operations of the vehicle 100 in accordance with the environmental data measurements depending upon the particular scenario.

The navigation-related operations may thus cause the vehicle 100 to execute a specific action based upon the environmental model to comply with the SDM parameters defined by the SDM model as discussed herein. For instance, navigation-related operations may include steering the vehicle 100 to follow a computed (and validated, as further discussed below) vehicle trajectory, changing an acceleration and/or velocity of the vehicle 100, executing predetermined trajectory maneuvers, etc. In other words, the environmental model may be generated at least in part on sensor data received via the various sensors of the vehicle 100 as noted herein, and the applicable driving policy model may then be applied together with the environmental model to determine a navigation-related operation to be performed by the vehicle.

IV. Trajectory Validation

As noted above, L2+ ADAS features need to comply with ASIL-D standard requirements for safety and/or other applicable regulatory safety requirements. Such requirements often dictate the need for redundancy at various levels responsible for computing and executing vehicle control, which may include redundancy in components (e.g. sensors) as well as how specific control-based features, such as the vehicle trajectories as described herein, are computed. However, conventional approaches to meet such redundancy requirements have various drawbacks. As further discussed herein, these drawbacks extend to the redundancy that is implemented to validate the computation of vehicle trajectories. Specifically, conventional techniques to redundantly validate computed vehicle trajectories include the use of redundant algorithms and inputs to those algorithms. The techniques described herein address these issues by providing a robust redundant trajectory validation technique that implements redundant algorithms executed on different hardware components, with each algorithm accessing different sets of vehicle sensors (e.g. cameras) as part of the trajectory validation process. For instance, each hardware component may independently perform trajectory validation based upon a projection of a vehicle trajectory onto one or more images obtained by a respective camera of a set associated with the vehicle, and the cameras among each set may be different than one another so that none of the cameras used for validation by each hardware component is common to or otherwise shared by one another. In this way, the techniques described herein may achieve redundancy without a full duplication of the components involved, and instead achieve this goal via the duplication of only a small portion of an overall vehicle system.

The embodiments herein are described with respect to an L2+ system by way of example and not limitation. However, to meet the L2+ safety requirements, the embodiments as further described herein assume that driver attention is being continuously maintained, which may be determined via an onboard driver monitoring system (DMS) for example. Thus, the various embodiments as described herein may be made available conditioned upon such a DMS determination or other suitable means to ensure that driver control is readily available. To this end, the embodiments described herein assume that when a driver is maintaining his gaze on the road, that the driver may take control in the steering axis (i.e. the x-axis) very quickly, i.e. 1.5-2.5 seconds in the future. It is noted that this time interval is much longer than it is assumed in a hands-on/eyes-on system, as the present embodiments are directed to a hands-off system that meets the L2+ safety requirements. This means that although a driver maintains his gaze on the road, his reaction time will be longer than in a hands-on system, which is why the redundant trajectory validation as described in further detail herein is particularly advantageous.

The embodiments described herein thus ensure that L2+ requirements for ASIL-D are met via a redundant trajectory validation process that includes an algorithm-based solution and an architectural-based solution. The algorithms as described herein may be implemented in accordance with any suitable type of trained machine learning (ML) models. Such ML models may comprise, for example, any suitable type of executed machine learning algorithm that, upon being trained, may be deployed and then implemented at inference to perform one or more tasks. These tasks may comprise, for instance, any suitable type of task for which the ML model has been trained using input from a training dataset. Thus, the trained ML model may provide any suitable type of predicted outputs in accordance with the configuration of the ML model and the type of training data that is provided. Additional details regarding the training data, inputs, and outputs of the ML are discussed in further detail below.

The aspects as described herein are not limited to a particular type of ML model. For example, the ML models as discussed herein may be configured to project 3D trajectories of a vehicle in which the ML is deployed to one or more 2D images acquired by the vehicle cameras. Once the ML model is trained, the trained ML model may then be deployed to a suitable computing system (e.g. the vehicle 100), and may then be used (e.g. via the safety system 200) to determine and/or execute the various functions as discussed in further detail herein. The trained ML models may additionally allow the safety system 200 to perform any suitable type of vehicle-based functions such as classifying road agents and/or predicting their trajectory. Other examples of such vehicle-based functions may include, for instance, a navigation-related operation via the use of controlled steering, braking, acceleration, etc.

The trained ML models as discussed in further detail herein are provided in the context of being deployed as part of a vehicle (e.g. as part of the safety system 200), and may be utilized at inference to perform tasks associated with any of the aspects as described herein. The ML models as discussed herein may have any suitable architecture, which may be a function of the particular tasks for which the ML model is trained to perform. Thus, the ML models as discussed herein may be alternatively referred to as "algorithms," "neural networks" or simply as "networks." For example, deep neural networks (DNNs) may be particularly useful for performing the trajectory projections and validation processes as discussed herein. The algorithm solutions may thus facilitate the use of a DNN that has been trained using a set of data inputs, as further discussed herein.

For example, the ML model may be trained in accordance with a large training dataset that includes overhead (e.g. drone) view images of the road, as well as a mask of trajectory points. The ML model may be trained using ground truth data, which may be derived from the REM maps or any suitable data source as discussed herein. The ground truth data may be obtained, for example, via the use a suitable 3D augmentation algorithm in conjunction with a trusted map data source. In an embodiment, this may be achieved via the use of the REM maps in conjunction with B-spline 3D augmentations. B-spline is a known mathematical technique regarding how REM describe paths, and includes an interpolation of points in a continuous manner to create a smooth curve out of points. See https://en.wikipedia.org/wiki/B-spline.

Thus, once deployed, the trained ML model may receive similar images corresponding to the current geographic location of the vehicle 100, and output a mapping of a computed 3D vehicle trajectory to a current camera image acquired by one or more cameras of the vehicle, as further discussed below. This may comprise, for instance, outputting for each 3D point in the vehicle trajectory a distance from predefined road boundaries (e.g. the edge of the road or lane). In an embodiment, the ML model may implement this functionality by first acquiring the drone view and the trajectory point projections. The ML model then uses these inputs to output a distance from the boundaries of each point, and the correction of each point to the middle of the left and right boundaries of the drivable path (which may include the y-axis correction as noted herein). Then, the ML model utilizes both of the outputs to obtain a final decision regarding the validation of the trajectory (i.e. the current drivable path) by determining whether the vehicle, when following the projected trajectory, will remain within a predefined boundary (e.g. its current lane). If so, the vehicle trajectory is determined to be valid, and is otherwise invalid. Furthermore, the trained ML model may learn the regression over time to fix poorly calculated vehicle trajectories, i.e. those that fail validation as further discussed herein.

To provide an illustrative example, the safety system 200 may determine a drivable path from REM (e.g. a computed vehicle trajectory) and output the drivable path as being either valid or invalid without the use of the REM maps. This initial verification may be performed in any suitable manner, including known techniques. The path is then determined to be valid or invalid using the projection of the drivable path onto a plane of a camera image, as discussed in further detail herein. If the ML models determine the drivable path to be invalid, then the autonomous driving cannot continue and the driver needs to take the control until the validator (i.e. the system 400 as discussed herein) provides valid values. In this way, the vehicle trajectory validation system as discussed herein may be implemented independently or as an additional layer on top of other trajectory validations performed by the vehicle 100.

Embodiments also include the output of the validator system as described herein being used to enable the safety system 200 to present any suitable "slow down" warning due to the validator being less confident from a further range. That is, the embodiments are primarily described herein with respect to the ML models either validating or invalidating a computed vehicle trajectory, which may be based upon the output of the ML model exceeding respective threshold values of probabilities. However, additional thresholds may be established that indicate that the predicted validity (or invalidity) of the computed vehicle trajectory is less confident, or that the ML model is "unsure" of the state of validity of the vehicle trajectory at a particular time. In such a case, a slow-down warning may be issued until the validity or invalidity determination exceeds a respective threshold value. For example, in the "unsure" state, when a threshold distance and/or future time horizon exceeded (e.g. between 2.0-2.5 seconds ahead), the validator (e.g. the MCU 406) may output any suitable control signals to enable a slow-down warning to be presented until a higher confidence decision may be made that the computed vehicle trajectory is indeed problematic.

The trained ML models as discussed herein may be implemented, for instance, via a suitable computing device and/or processing circuitry identified with the vehicle 100 and/or the safety system 200. This may include, for example, the one or more processors 102, one or more of the processors 214A, 214B, 216, 218, etc., executing instructions stored in a suitable memory (e.g. the one or more memories 202). The trained ML models may advantageously be implemented on separate processor platforms, as further discussed herein, each operating using different camera inputs to facilitate robust trajectory validation. The trajectory projection calculations as discussed herein may be performed by any suitable processing components, such as those identified with the safety system 200, for instance, to provide the appropriate input to the trained ML models for trajectory validation as discussed herein.

In any event, the trained ML model functions to receive a projection or mapping of a computed 3D vehicle trajectory onto a 2D image that is acquired via a subset of the vehicle's cameras (e.g. a portion of the image acquisition devices 104). Each trained ML model then verifies that specific conditions are met, which include that the trajectory does not carry the vehicle off the road or into oncoming traffic. Furthermore, each trained ML model compares a starting position of the vehicle trajectory with an ending point of the trajectory to validate the vehicle trajectory over a suitable time horizon. For instance, the starting point of the vehicle trajectory may comprise the vehicle's current position, and the ending point of the vehicle trajectory may be that identified with an REM path to be driven over a future time horizon (e.g. in the next 2.5 seconds). The embodiments as discussed herein thus enable the validation of a vehicle trajectory over this future time horizon by determining a distance to "look ahead" by multiplying the current ego speed of the vehicle by this future time horizon.

Furthermore, to reduce the possibility of providing a false negative by way of the trajectory validation processes as described herein, the algorithm solutions may optionally include a y-axis correction. For instance, the x-axis may be considered the "yaw" or steering axis that is perpendicular to the direction of vehicle travel, which represents the z-axis. Thus, the surface identified with navigation of the vehicle is defined as an x-z plane. The y-axis, therefore, represents a third axis that is projection upwards from the road surface that is orthogonal to the x- and z-axes. With this in mind, the drivable path, which is also referred to herein as the computed vehicle trajectory, needs to be accurate in the x-z axes but not in the y-axis. Without a y-axis correction, a risk exists of making a corresponding projection of the computed trajectory onto a particular image plane look inaccurate in two-dimensions, although the drive can continue with this "error" because only the x-z plane matters for the purpose of driving policy.

Thus, to address this issue, data may be run through the trained ML model (e.g. a DNN) twice. In the first pass, the y-axis projection issue, if present, is addressed. Then, during a second pass, the fixed projection is fed back into the trained ML model, which makes a determination regarding whether a plausible x-z solution exists that is also valid. This process is illustrated in further detail in FIGS. 3A-3B. For example, a trained ML model may receive the (initial) projection of the vehicle trajectory onto an image plane, as further discussed herein. The ML model may then adjust the XYZ points of the projected trajectory by running the initial projected vehicle trajectory through the ML model once to obtain the y-axis corrected trajectory as discussed herein. Once corrected, the y-axis corrected vehicle trajectory may then be projected onto the same image plane that was used for the initial projection. This may be achieved, for instance, via the use of any suitable mathematical projection via any suitable processing components (e.g. any suitable portion of the safety system 200). Once the y-axis vehicle trajectory projection is obtained in this manner, it is then fed back into the ML trained model a second time and used as the basis to determine the validity of initial computed vehicle trajectory by determining the validity of the new, y-axis corrected projection.

Figure 3B:
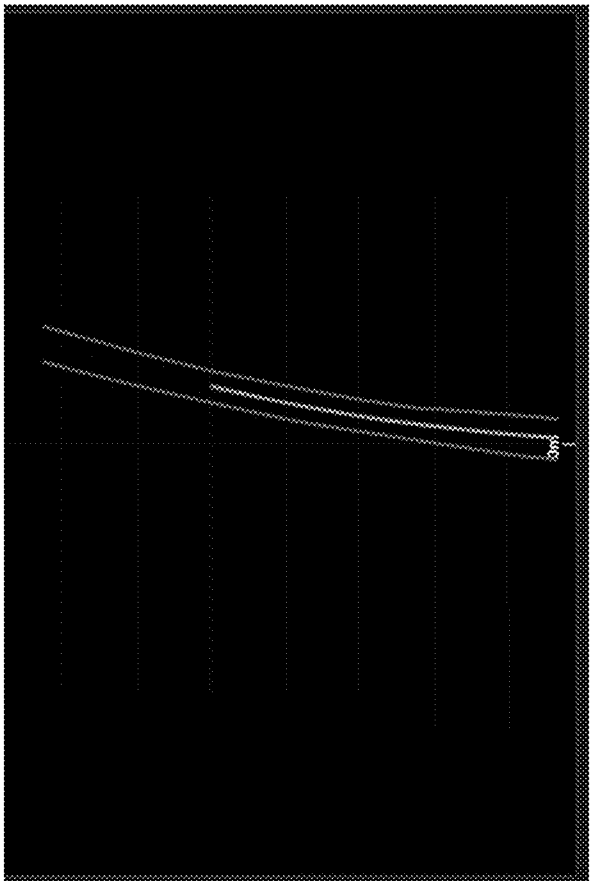
FIGS. 3A-3B illustrate example images corresponding to the use of a y-axis trajectory correction algorithm, in accordance with one or more aspects of the present disclosure.
Figure 3A:
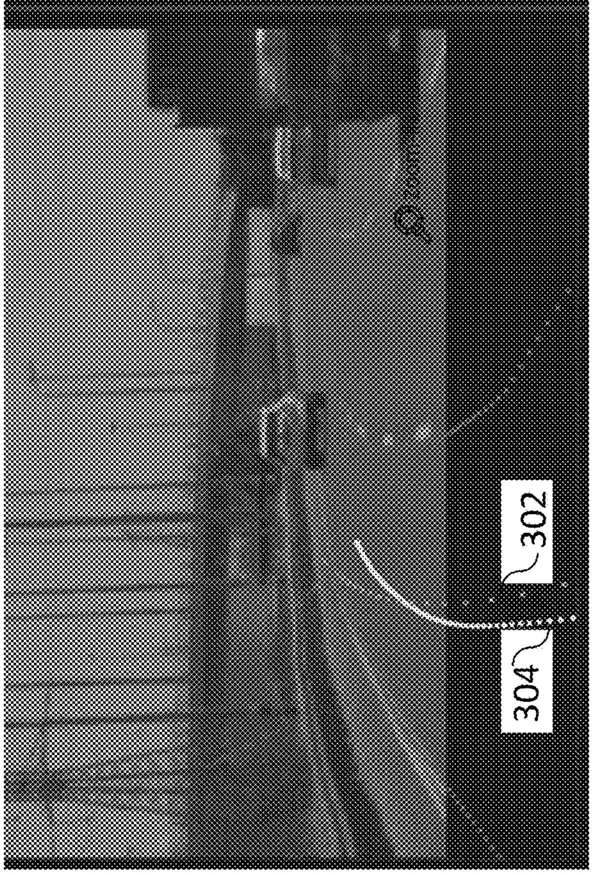

For example, the trajectory 302 represents the original projection prior to y-axis correction, whereas the trajectory 304 represents the projected trajectory after the y-axis fix. FIG. 3B illustrates an x-z top view in which the resulting trajectory 304 looks accurate. In accordance with such embodiments, the projected trajectory 304 will not result in a validation failure, but a suitable alert may optionally be generated that only the y-axis projection is inaccurate although the x-z planar projection is accurate.

Additionally, the hardware solutions as described herein verify that there is no single point of failure in the system, e.g. the camera inputs to the algorithms noted above. The hardware solutions also ensure that the computed vehicle trajectory, if used, will meet the conditions as noted above. The embodiments described herein implement an architectural hardware-based solution to ensure that the trajectory verification is performed to meet ASIL D level requirements.

It is noted that the architectural solutions described herein address the issues with conventional trajectory validation, which are caused by the verification of a trajectory against an image used in its generation, preventing the requirements of ASIL D from being met. Moreover, conventional trajectory validation techniques use the same camera as part of the redundancy solution, and thus the image used for trajectory validation is associated with a single point of failure. Additionally, ASIL D requirements cannot be achieved by validating the trajectory on the same chip in which the trajectory was calculated, as the processes of trajectory generation and validation in such cases are not fully independent of one another.

Thus, the embodiments as further described address these issues by implementing two separate instances of a trajectory validator algorithm as discussed herein, each being executed on a separate hardware component. For instance, and turning now to FIG. 4, an example block diagram is shown of a hardware architecture for performing vehicle trajectory validation using redundant components, in accordance with one or more aspects of the present disclosure.

Figure 4:
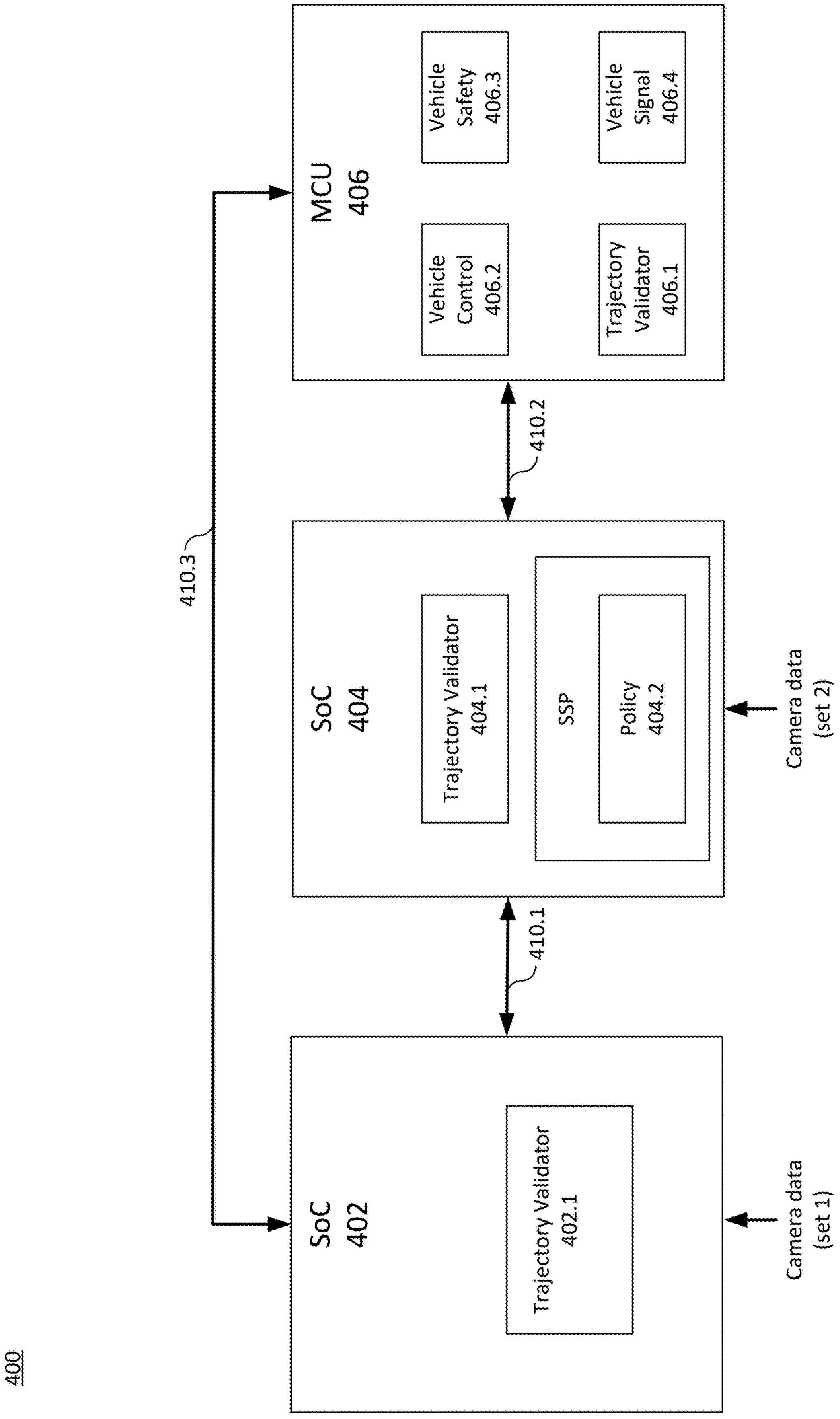
FIG. 4 illustrates an example block diagram of a hardware architecture for performing vehicle trajectory validation using redundant components, in accordance with one or more aspects of the present disclosure.

The architecture 400 (also referred to herein as a system) as shown in FIG. 4 comprises two separate systems on a chip (SoCs) 402, 404, as well as a microcontroller (MCU) 406. The SoCs 402, 404, and the MCU 406 may be identified for example with the one or more processors 102 as discussed herein with respect to the safety system 200. Furthermore, although referred to herein as an MCU, the MCU 406, may be implemented as any suitable type of component configured to perform the processing operations and functionality as discussed herein, such as an additional SoC, chip, etc.

The SoCs 402, 404, and the MCU 406, may be implemented as any suitable combination of hardware and software components configured to perform the various functions as discussed herein. For example, the SoCs 402, 404 may be configured to execute a respectively-trained machine learning model (e.g. a DNN) that is associated with each of the trajectory validator modules 402.1, 404.1, as shown in FIG. 4. As another example, the MCU 406 may be configured as part of the safety system 200, such as an ECU of the vehicle 100, and may be configured to handle vehicle control and monitoring via the generation and execution of various vehicle controls and/or commands that are transmitted to their respective vehicle components. In an embodiment, the SoCs 402, 404 are ASIL B compliant processors and/or comprise ASIL B compliant processor components, whereas the MCU 406 is an ASIL D compliant processor and/or comprises ASIL D compliant processor components. In this way, the redundant validation in the ASIL B components is verified via an ASIL D compliant component to achieve ASIL D compliance for the entire trajectory validation process.

Each of the SoCs 402, 404 and the MCU 406 are communicatively coupled to one another via any suitable number and/or configuration of communication links, with three being shown in FIG. 4 as links 410.1, 410.2, and 410.3, and which may include wired and/or wireless links. The SoCs 402, 404, and the MCU 406, may utilize these links to communicate any suitable type of data and/or signals between one another, with some examples of such communications being discussed in further detail below.

The SoCs 402, 404 may be identical or substantially similar to one another with respect to their design, configuration, and functionality. However, the SoCs 402, 404 may receive data inputs from different sources within the vehicle 100, and thus each of the SoCs 402, 404 is configured to perform its respective functions in accordance with the data received via these separate inputs. For example, the SoC 402 as shown in FIG. 4 may receive camera data (e.g. image frames) acquired via a set of vehicle cameras. These may include, for example, the main (i.e. a primary front-facing vehicle camera), a front-facing narrow camera, four parking cameras (i.e. front, rear, left, and right), a rear-facing camera, etc. The SoC 404, in contrast, may receive data (e.g. image frames) from a different set of vehicle cameras such as, for example, four corner cameras (i.e. the front left and front right cameras and the rear left and rear right cameras). Thus, the trajectory validator modules 402.1, 404.1 may execute machine learning trained models that may be trained to validate trajectories that have been projected onto 2D image space of respective image planes in accordance with the type of camera images that are anticipated to be received in each case.

Figure 5:
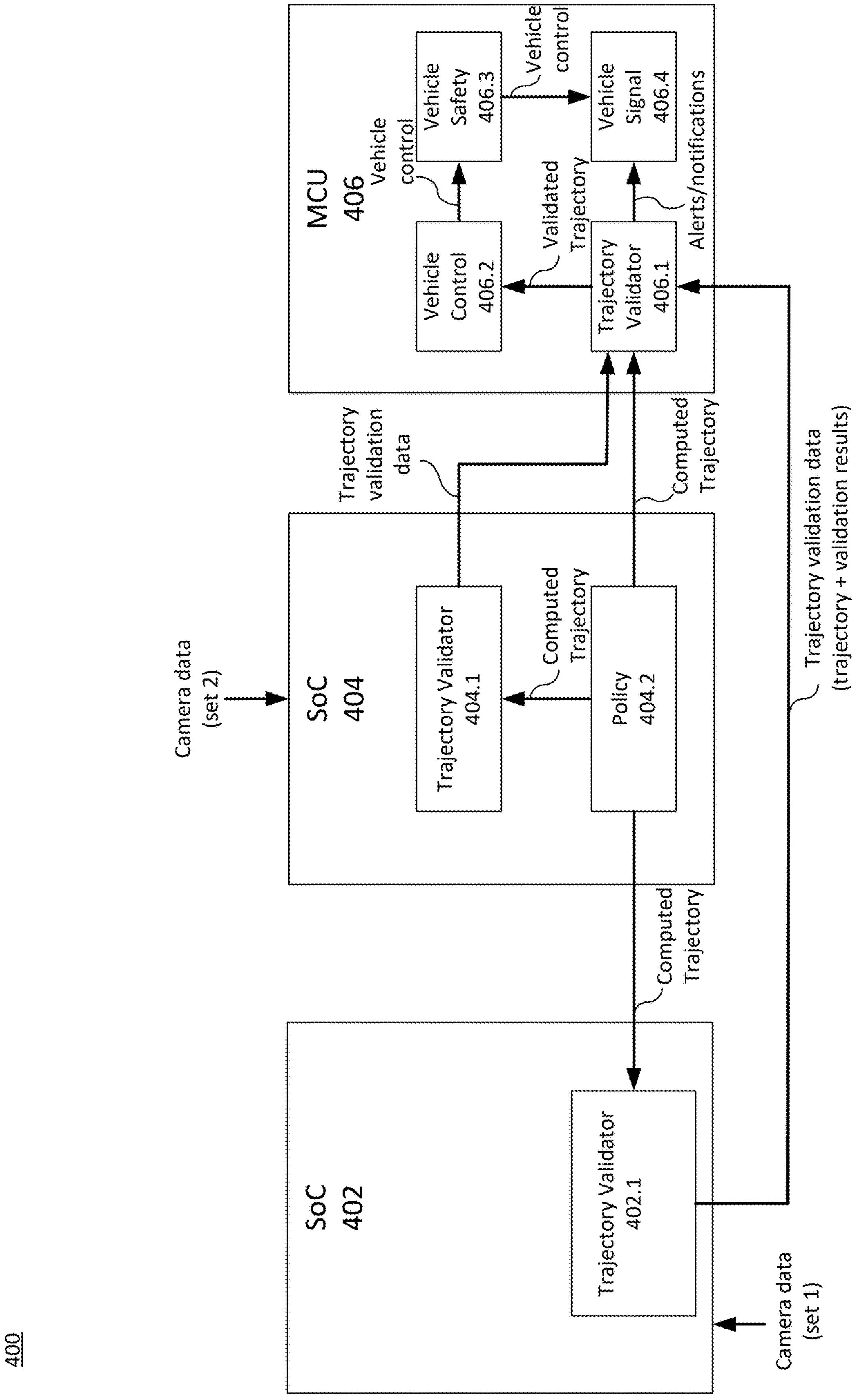
FIG. 5 illustrates an example block diagram of the hardware architecture in FIG. 4 showing additional detail with respect to the trajectory validation process, in accordance with one or more aspects of the present disclosure.

The safety system 200 may implement a driving policy that is utilized to generate vehicle trajectories using any suitable techniques, including known techniques. Thus, the computed vehicle trajectories that are provided to the validator modules 402.1, 404.1 may represent any suitable "drivable path," and may represent a list of 3D points. These points are then validated as further discussed herein to determine whether the drivable path is valid or invalid. Thus, the computed vehicle trajectory as referenced herein may comprise, for instance, an AV trajectory, an REM drivable path (e.g. obtained from the REM map), an online road drivable path (also referred to as "path prediction" by an onboard road algorithm), etc. The computation of the drivable path in this manner may be implemented, for example, at the SoC 404 via the policy module 404.2, which forms part of an overall Sensing State and Policy (SSP). The SSP may utilize the SDM parameters as discussed herein to ensure that this drivable path complies with the safety framework of the SDM. Once generated, and as shown in FIG. 5, the same vehicle trajectory (shown in the Figures as "computed trajectories") is transmitted as vehicle trajectory data to the SoC 402, to the trajectory validator module 404.1 of the SoC 404, and also to the trajectory validator module 406.1 of the MCU 406. This trajectory may thus represent a "candidate" or "potential" vehicle trajectory that may be used for vehicle control, pending its validation as further discussed herein.

Additional detail regarding the operation of the architecture 400 is shown in FIG. 5. For instance, FIG. 5 further illustrates that the computed, vehicle trajectory is transmitted to the MCU trajectory validator module 406.1 running on the MCU 406, the trajectory validator module 402.1 running on the SoC 402, as well as to the instance of the trajectory validator module 404.1 running on the SoC 404. The computed vehicle trajectories and the trajectory validation data as shown in FIG. 5 may be communicated between the SoCs 402, 404, and the MCU 406 implementing, for instance, the data links 410.1, 410.2, 410.3 as shown and discussed with respect to FIG. 4. Thus, FIG. 5 presents logical data flows associated with data that is transmitted over the data links 410.1, 410.2, 410.3 as shown in FIG. 4.

The trajectory validator modules 402.1, 404.1 each validate the calculated (and 2D projected) vehicle trajectory received from the SoC 404 against their respectively acquired images by way of the execution of a respectively trained ML model, which again may comprise a DNN-based trajectory validator. Again, the embodiments described herein may utilize different camera inputs per each of the trajectory validator modules 402.1, 404.1 to perform each respective trajectory validation. For instance, the SoC 402 may receive the projection of the vehicle trajectory onto a camera image plane (the vehicle's front-facing or "main" camera image plane in this example). The SoC 402 may then validate the vehicle trajectory by utilizing the trajectory validator module 402.1. Then, the trajectory validator module 402.1 validates (i.e. verifies) that each point of the projected trajectory remains within a predefined boundary (e.g. the road limits). As an example, the trajectory validator module 402.1 may function to predict the distance of each point from the left and right boundaries of the current computed vehicle trajectory, and validate the vehicle trajectory when this predicted distance is within a predefined boundary such as one formed by each edge of the road (e.g. the off-road edge and an edge defining the boundary to an oncoming traffic lane).

The SoC 404 validates the vehicle trajectory by utilizing the trajectory validator module 404.1. To do so, the SoC 404 receives a projection of the computed vehicle trajectory onto each camera image plane of a different set of cameras (e.g. a plane associated with the vehicle's side or front "corner" cameras, also referred to herein as the front left and front right cameras in this example). Then, the trajectory validator module 404.1 likewise validates (i.e. verifies) that each point of the projected trajectory remains within a predefined boundary. For the use of the vehicle's side cameras, the defined boundaries of the drivable path is dependent upon the orientation of the vehicle trajectory with respect to the vehicle at the time the validation is performed. For instance, one of the front left or the front right cameras may be used to identify the oncoming lane edge, whereas the other one of the front left or the front right camera may be used to identify the road edge. In this way, the trajectory validator module 404.1 may run separate verifications of the trajectory by comparing the projection of the images acquired via the front left and front right cameras with each respective image plane against the predefined boundaries of the drivable path, which again may be obtained via the front left and front right cameras in this example.

In each case, the validation of the vehicle trajectory may comprise a determination of whether each point of the projected vehicle trajectory remains within a predefined boundary, as noted above, with the computed trajectory being validated only when this is the case, as further discussed herein. This may include, to provide an illustrative and non-limiting example, a determination of whether the projection of the vehicle trajectory onto the respective camera image plane would result in the vehicle crossing a road edge boundary or an oncoming traffic lane boundary, and may account for the y-axis projection correction in doing so as noted herein. When multiple cameras are used for the validation process, the trajectory may be validated only when the projection of the trajectory satisfies the predefined boundary conditions for each acquired image (for both the front left and front right cameras in this example).

Again, when implemented as DNNs, it is noted that each of the trajectory validator modules 402.1, 404.1 may execute respectively trained DNNs using training data associated with the expected images to be received for that particular SoC. Each of the trajectory validator modules 402.1, 404.1 then validates the same trajectory by first determining whether the vehicle trajectory provided by the policy module 404.2, as shown in FIG. 5 as the computed trajectory, when projected onto an acquired camera image plane in each case (e.g. per camera), remains within a predefined boundary. Thus, a computed vehicle trajectory is not validated in either case when points constituting the projected trajectory deviate outside of any suitable predefined boundary (e.g. road edges) for any of the acquired camera images.

Again, the MCU 406 may be implemented as any suitable number and/or type of processors, such as for example the one or more processors 102 as discussed herein with respect to the safety system 200. The various modules of the MCU 406 as shown in FIGS. 4-5, 6A and 6B may thus comprise any suitable type of hardware components, software components, or combinations of these to implement the corresponding functionality as discussed herein. For example, any of (or all) of the modules of the MCU 406, such as the trajectory validator module 406.1, the vehicle control module 406.2, the vehicle safety module 406.3, and the vehicle signal module 406.4 may be implemented via the execution of respective computer-readable instructions, as trained machine learning models, or as any suitable combination of such components in conjunction with suitable components of the safety system 200.

In any event, each of the trajectory validator modules 402.1, 404.1 transmits both the vehicle trajectory used and the result of the validation to the trajectory validator module 406.1 running on the MCU 406. Thus, the "trajectory validation data" as shown in FIG. 5, which is output via each of the trajectory validator modules 402.1, 404.1, is data that represents both the trajectory used to perform the trajectory validation as well as the results of that validation. The MCU trajectory validator module 406.1 in turn first confirms that the trajectories used by each of the trajectory validator modules 402.1, 404.1 are identical to the vehicle trajectory that it received from the policy module 404.2 (i.e. the calculated trajectory received via the SoC 404, as noted above). In this way, the MCU trajectory validator module 406.1 initially confirms that each of the trajectory validator modules 402.1, 404.1 validated the same trajectory that the MCU 406 received from the SoC 404.

If this is not the case, then the MCU trajectory validator module 406.1 does not validate the vehicle trajectory. That is, the MCU trajectory validator module 406.1 may trigger the generation of a suitable alert/notification to the vehicle signal module 406.4, as shown in FIG. 5. This may result, for example, in the notification of a trajectory mismatch to a driver, to any suitable components of the safety system 200, and/or to the SoCs 402, 404, which may trigger the SoC 404 to calculate a new trajectory for validation or cause any suitable action as a result (e.g. identifying errors, performing diagnostics, etc.).

However, when the MCU trajectory validator module 406.1 validates that each of the trajectory validator modules 402.1, 404.1 validated the same trajectory that the MCU 406 received from the SoC 404, then the MCU trajectory validator module 406.1 further determines whether the trajectory validation output by the trajectory validator modules 402.1, 404.1 both indicate that the vehicle trajectory has been validated. In this way, only when this is also the case, the MCU trajectory validator module 406.1 determines that the "final" validation of the vehicle trajectory has passed. As a result, the MCU trajectory validator module 406.1 then passes the vehicle trajectory down the pipeline for vehicle control generation, e.g. by providing the validated trajectory to the vehicle control module 406.2 as shown in FIG. 5.

Figure 8A:
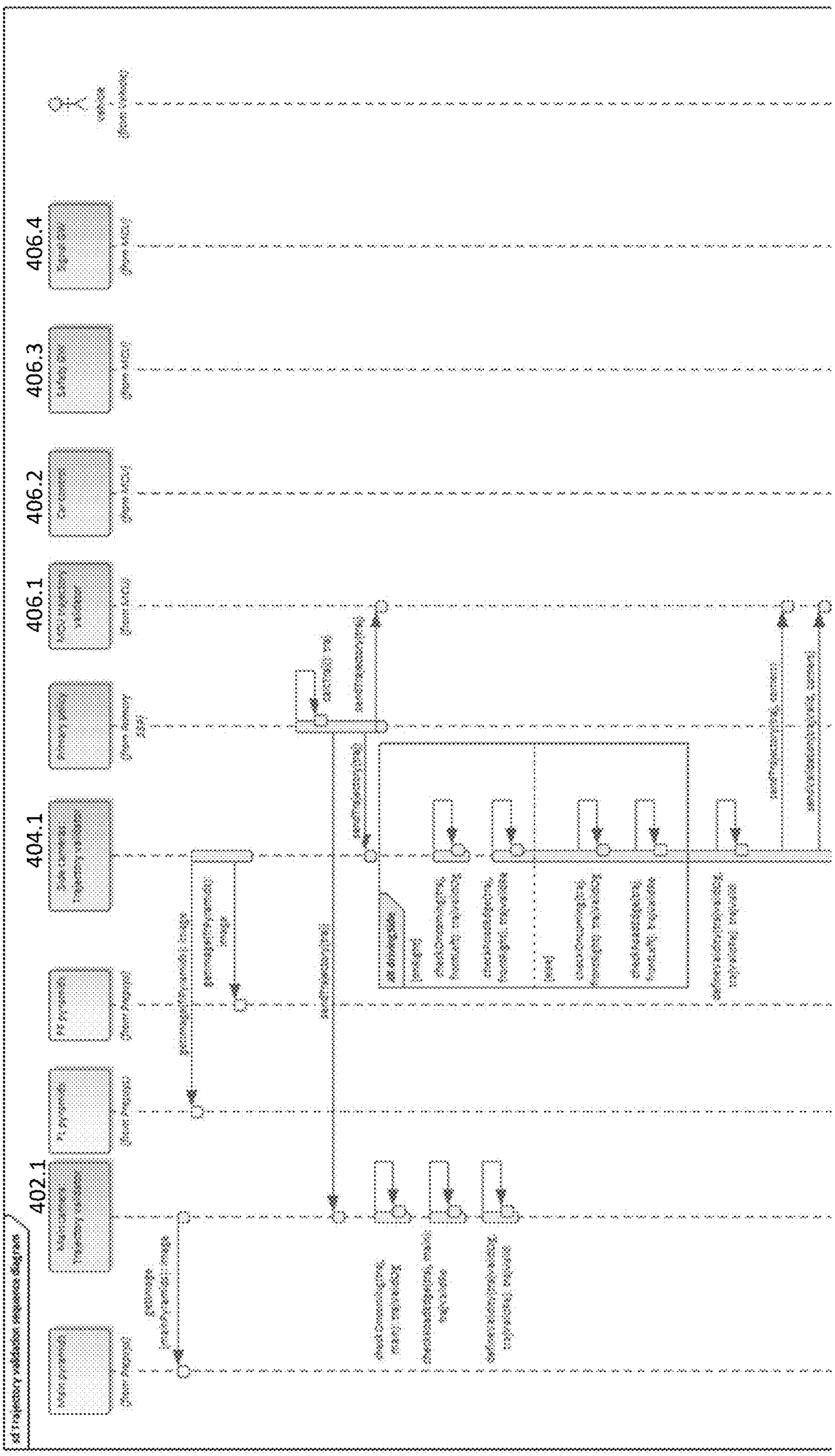
FIGS. 8A and 8B illustrate an example sequence diagram for the hardware architecture with respect to a trajectory validation process, in accordance with one or more aspects of the present disclosure.
Figure 8B:
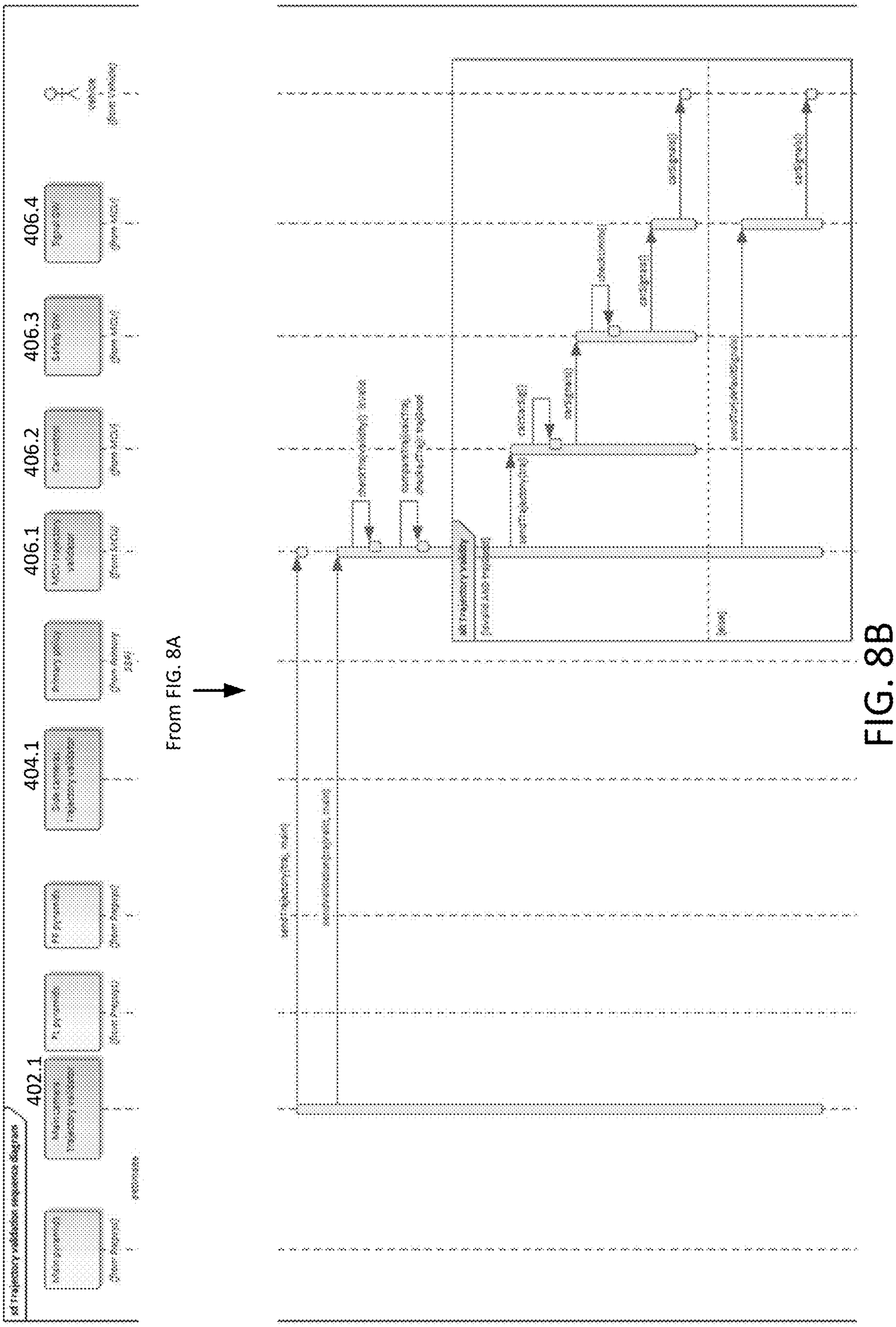

The vehicle control module 406.2 may be configured to calculate any suitable type of vehicle control signals based upon the received validated trajectory, as shown in FIG. 8B. These control signals may include any suitable number and/or type of signals that are potentially transmitted to the various subcomponents of the vehicle 100 as part of the overall operation of the safety system 200, pending further safety checks as noted below. For example, the vehicle control module 406.2 may generate vehicle control signals that enable the vehicle 100 to follow the validated vehicle trajectory via the actuation, control, and/or adjustment of any suitable vehicle control parameters such as steering, braking, acceleration, etc.

Additionally, and as shown in FIG. 8B, the vehicle safety module 406.2 may be configured to verify that the execution of the control signals does not pose a safety risk to the occupants or others in the driving environment. For example, the vehicle safety module 406.2 may verify that execution of the particular validated trajectory using the control signals complies with the framework of the SDM parameters and/or other suitable parameters such that the validated trajectory may be executed safely.

If so, then the vehicle safety module 406.2 may pass the control signals to the vehicle signal module 406.4, which may then transmit the control signals to the various subcomponents of the vehicle 100 to maneuver the vehicle 100 in accordance with the validated trajectory. The vehicle signal module 406.4 may additionally or alternatively provide other functionality with respect to the generation of any suitable signals that may enable alerts and/or notifications to be presented to occupants of the vehicle 100 via a suitable user interface associated with the safety system 200. This may include, for instance, ADAS alerts, proximity warnings, hazards identified while the vehicle 100 traverses the validated trajectory, etc.

However, if the trajectory that was validated by either of the trajectory validator modules 402.1, 404.1 differs from that received by the MCU 406 and/or if at least one of the trajectory validation checks (i.e. those performed by the trajectory validator modules 402.1, 404.1) fails, then the MCU trajectory validator module 406.1 initiates a hands-on request (HOR) (e.g. via the vehicle signal module 406.4) from the driver to take control of the vehicle 100. Additional details regarding the data that is transferred between the SoCs 402, 404 and the MCU 406 as part of the vehicle trajectory validation process as discussed herein are shown in FIGS. 8A and 8B, which illustrate an example sequence diagram for the hardware architecture 400 as shown in FIG. 4 with respect to the vehicle trajectory validation process. With respect to FIGS. 8A and 8B, the term "pyramids" is shown, which in this context refers to the camera images in each case. For example, the "main pyramids" refers to images acquired via the main front-facing camera used by the trajectory validator 402.1. As another example, the "FL pyramids" and "FR pyramids" refer to the camera images acquired by the front left and front right (i.e. the side cameras) used by the trajectory validator module 404.1.

Figure 6A:
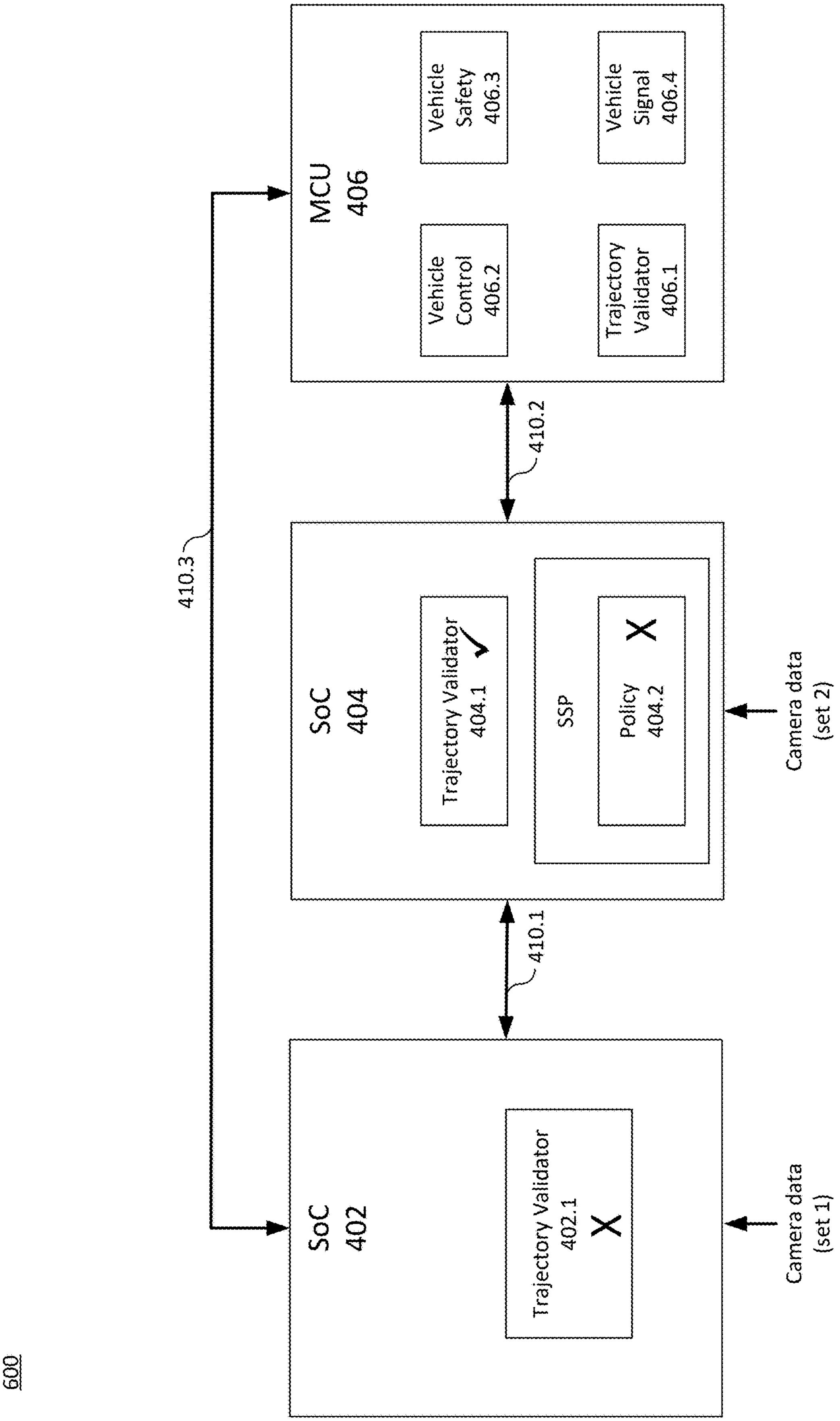
FIG. 6A illustrates an example failure detection as part of the trajectory validation process due to side camera or SoC failure, in accordance with one or more aspects of the present disclosure.

The use of redundancy in both the implementation of algorithms as well as the use of independent SoCs ensures that a failure of any camera used for the validation of a vehicle trajectory by the trajectory validator modules 402.1, 404.1 will result in a failure to validate the computed vehicle trajectory. For example, FIG. 6A illustrates a scenario 600 in which the main camera fails, which is input to the SoC 402 and used by the trajectory validator module 402.1 to validate the computed vehicle trajectory. Thus, in the scenario 600 as shown in FIG. 6A, the side cameras used by the trajectory validator module 404.1 are functional, although the main camera that is used as an input to the trajectory validator module 402.1 of the SoC 402 is assumed to have failed. In this case, validator module 402.1 may falsely validate the vehicle trajectory because its input (the main camera feed in this example) is faulty. However, the validator module 404.1 will still catch the faulty vehicle trajectory because all of its inputs are valid, and the MCU 406 will thus not validate the vehicle trajectory and prevent the vehicle trajectory from being used for the vehicle control and issue a HOR/TOR. It is noted that the MCU trajectory validator module 406.1 also detects the failure of the SoC 402 itself via the use of the validation redundancy as described herein. In this way, the use of the redundant SoCs 402, 404 separately ensures that a hardware failure of either the SoC 402 or the SoC 404 likewise prevents a false validation of a vehicle trajectory.

Figure 6B:
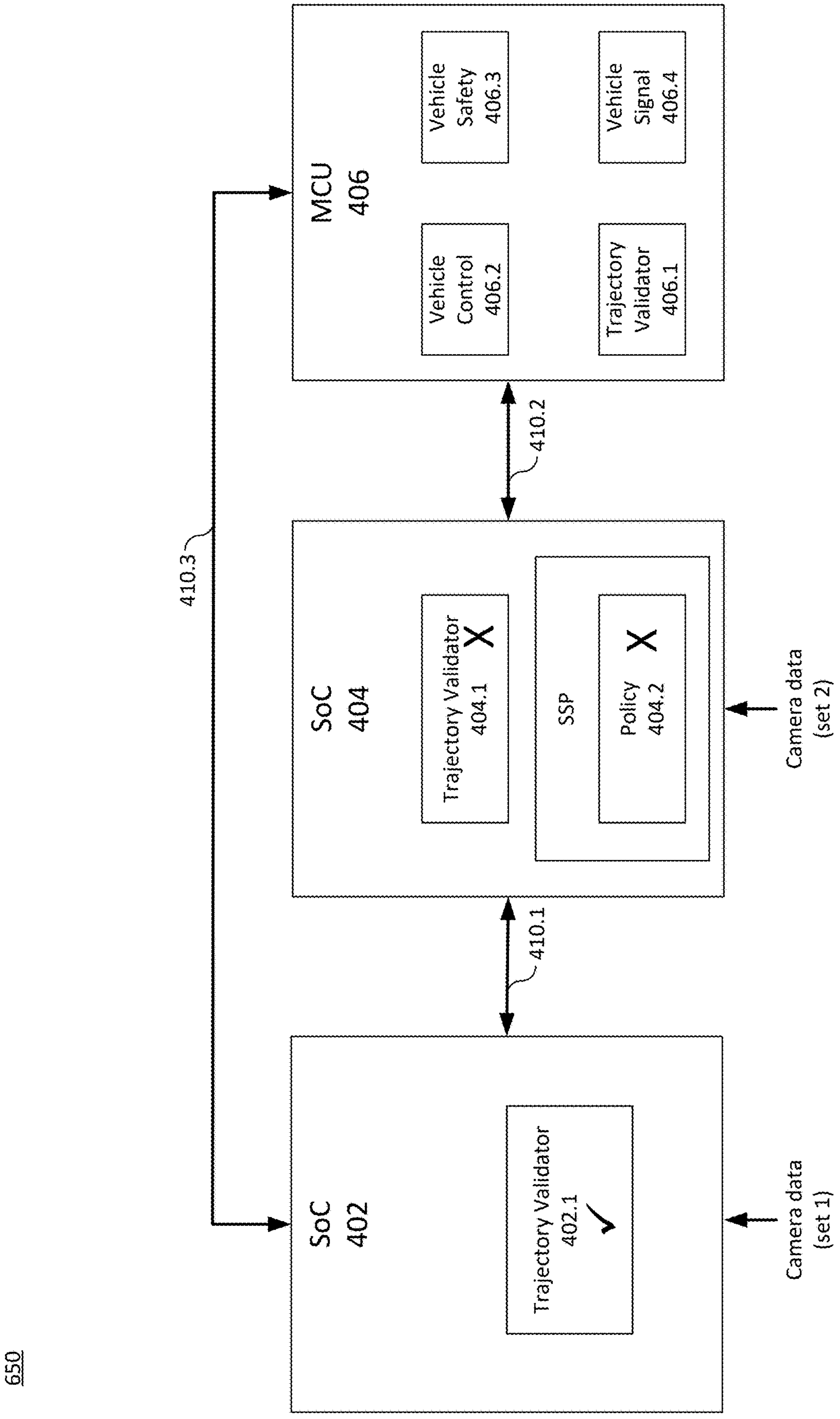
FIG. 6B illustrates an example failure detection as part of the trajectory validation process due to front camera or SoC failure, in accordance with one or more aspects of the present disclosure.

As another example, FIG. 6B illustrates a scenario 650 in which a side camera (e.g. a front left or front right camera) camera fails, which is input to the SoC 404 and used by the trajectory validator module 404.1 to validate the vehicle trajectory. Additionally or alternatively, as discussed above with respect to FIG. 6A, the scenario in FIG. 6B may include the failure of the SoC 404. In either or both cases, the main camera used by the trajectory validator module 402.1 is assumed to remain functional along with the SoC 402. In this scenario, the validator module 404.1 may falsely validate the vehicle trajectory because its input (one or both of the side camera feeds in this example) is/are faulty. However, the validator module 402.1 will still catch the faulty vehicle trajectory because all of its inputs are valid, and the MCU 406 will thus not validate the vehicle trajectory and prevent the vehicle trajectory from being used for the vehicle control and issue a HOR/TOR. Thus, the MCU trajectory validator module 406.1 detects the failure due to the trajectory validator module 402.1 failing to validate the vehicle trajectory.

FIG. 7 illustrates a table of example detected failure modes with respect to the trajectory validation process, in accordance with one or more aspects of the present disclosure. The front main camera listed in the table 700 may correspond, for instance, to the camera input received by the trajectory validator module 402.1, which is used to perform one vehicle trajectory validation. The FL and FR cameras may correspond, for instance, to the camera inputs received by the trajectory validator module 404.1, which is used to perform another vehicle trajectory validation, as noted herein. As shown in FIG. 7, the failure modes are detected when at least one point of failure is detected, which may include any combination of a camera failure, a trajectory failure, the failure of the SoC 402, the failure of the SoC 404, and/or the failure of the trajectory validator modules 402.1, 404.1. As shown in FIG. 7, in each case the vehicle trajectory is not validated and thus is not passed through the pipeline for vehicle control generation by the MCU 406. For this to be the case, a failure in the trajectory cannot be present, and the resulting output of the trajectory validator modules 402.1, 404.1 also need to validate the vehicle trajectory, as noted above.

V. A Process Flow

Figure 9:
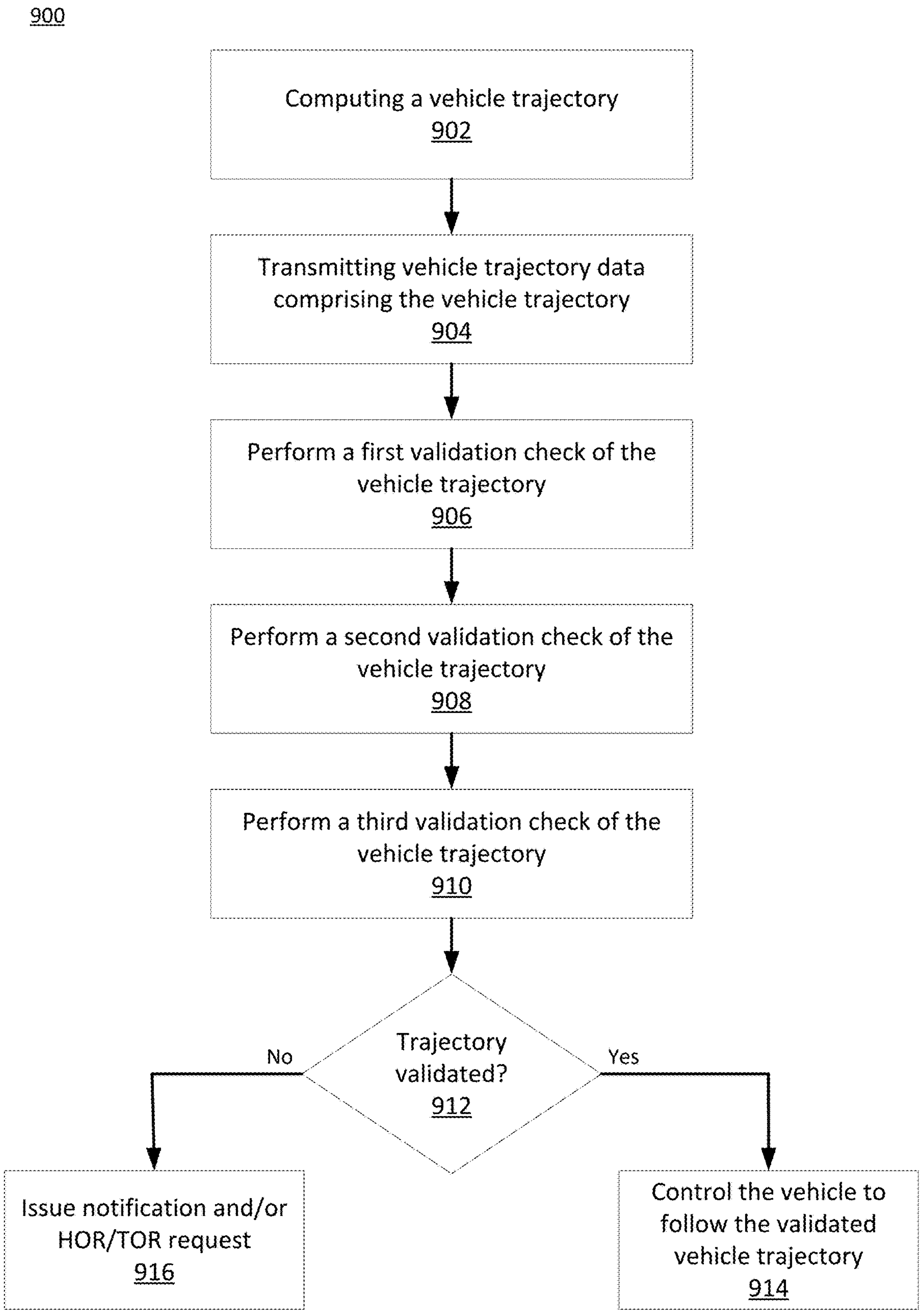
FIG. 9 illustrates a process flow, in accordance with the disclosure.

FIG. 9 illustrates a process flow, in accordance with the disclosure. With reference to FIG. 9, the flow 900 may be manual process, a fully-automated process, or a partially-automated process. When fully or partially-automated, any portion or the entirety of the flow 900 may be implemented as a computer-implemented process executed by and/or otherwise associated with one or more processors. These processors may be associated with one or more computing components identified with any suitable computing device or architecture, such as the one or more processors of the safety system 200, any components of the architecture 400, etc. The process flow 900 may include alternate or additional steps that are not shown in FIG. 9 for purposes of brevity, and may be performed in a different order than the steps shown in FIG. 9.

With respect to FIG. 9, the process flow 900 may begin by computing (block 902) a vehicle trajectory. This may include, for instance, calculating an initial trajectory that may potentially be used as a drivable path for the vehicle 100 to follow, subject to the validation checks as noted herein.

The process flow 900 may include transmitting (block 904) vehicle trajectory data comprising the calculated vehicle trajectory. This may include, for example, the SoC 404 transmitting the calculated vehicle trajectory to the SoC 402 and the MCU 406, as discussed herein.

The process flow 900 may include performing (block 906), a first validation check of the vehicle trajectory. This may include, for example, the SoC 404 executing a first trained model (e.g. trajectory validator 404.1) to determine whether the vehicle trajectory passes a first validation check based upon whether points of a projection of the vehicle trajectory onto an image acquired via one or more cameras of the vehicle remain within a predefined boundary, as discussed herein.

The process flow 900 may include performing (block 908), a second validation check of the vehicle trajectory. This may include, for example, the SoC 402 executing a second trained model (e.g. trajectory validator 402.1) to determine whether the vehicle trajectory passes a second validation check based upon whether points of a projection of the vehicle trajectory onto an image acquired via one or more (e.g. different) cameras of the vehicle remain within a predefined boundary, as discussed herein.

The process flow 900 may include performing (block 910), a third (e.g. "final") validation check of the vehicle trajectory. This may include, for example, the MCU 406 determining that the SoCs 402, 404 each validated the same trajectory, and that each of the first and second validations passed, as discussed herein.

If the trajectory is validated (block 912, yes), then the process flow 900 may include controlling (block 914), the vehicle to follow the validated vehicle trajectory, pending the control and safety considerations as noted herein.

However, if the trajectory is not validated (block 912, no), then the process flow 900 may include issuing (block 916) a suitable notification and/or issue a HOR/TOR request in the vehicle such that a driver may take control of the vehicle.

EXAMPLES

The following examples pertain to further aspects.

An example (e.g. example 1) relates to a vehicle. The vehicle comprises a microcontroller (MCU); a first system on a chip (SoC); and a second SoC configured to compute a vehicle trajectory to potentially be used for control of the vehicle, and to transmit vehicle trajectory data comprising the vehicle trajectory to the MCU and the first SoC, wherein the first SoC is configured to execute a first trained model to determine whether the vehicle trajectory passes a first validation check based upon whether points of a projection of the vehicle trajectory onto an image acquired via a first camera of the vehicle remain within a predefined boundary, wherein the second SoC is configured to execute a second trained model to determine whether the vehicle trajectory passes a second validation check based upon whether points of a projection of the vehicle trajectory onto respective one or more further images acquired via a set of second cameras of the vehicle that are different from the first camera remain within the predefined boundary, and wherein the MCU is configured to perform a third validation check of the vehicle trajectory to selectively enable the vehicle trajectory to be used for control of the vehicle, the third validation check being conditioned upon whether the vehicle trajectory passes the first validation check and the second validation check.

Another example (e.g. example 2) relates to a previously-described example (e.g. example 1), wherein the MCU is configured to validate the vehicle trajectory via the third validation check when the vehicle trajectory passes the first validation check and the second validation check, and to otherwise not validate the vehicle trajectory.

Another example (e.g. example 3) relates to a previously-described example (e.g. any combination of examples 1-2), wherein the first SoC is configured to transmit first trajectory validation data to the MCU comprising (i) a result of whether the vehicle trajectory passed the first validation check, and (ii) the vehicle trajectory, and the second SoC is configured to transmit second trajectory validation data to the MCU comprising (i) a result of whether the vehicle trajectory passed the second validation check, and (ii) the vehicle trajectory.

Another example (e.g. example 4) relates to a previously-described example (e.g. any combination of examples 1-3), wherein the third validation check is further conditioned upon whether the vehicle trajectory received from the first SoC and the second SoC as part of the first trajectory validation data and the second trajectory validation data, respectively, match the vehicle trajectory transmitted by the second SoC to the MCU.

Another example (e.g. example 5) relates to a previously-described example (e.g. any combination of examples 1-4), wherein the first camera comprises a front-facing vehicle camera, and wherein the set of second cameras comprise side-facing vehicle cameras.

Another example (e.g. example 6) relates to a previously-described example (e.g. any combination of examples 1-5), wherein the third validation check satisfies Automotive Safety Integrity Level (ASIL) automotive risk classification level D (ASIL-D) requirements.

Another example (e.g. example 7) relates to a previously-described example (e.g. any combination of examples 1-6), wherein: the first SoC is configured to determine whether the vehicle trajectory passes the first validation check by determining, via the first trained model, whether each point of the projection of the vehicle trajectory onto the image is within a road edge boundary and an oncoming traffic lane boundary, and the second SoC is configured to determine whether the vehicle trajectory passes the second validation check by determining, via the second trained model, whether each point of the projection of the vehicle trajectory onto each respective image of the one or more further images is within the road edge boundary or the oncoming traffic lane boundary.

Another example (e.g. example 8) relates to a previously-described example (e.g. any combination of examples 1-7), wherein: a surface identified with navigation of the vehicle is defined as an x-z plane, with a y-axis defining a direction orthogonal to the x-z plane, the first SoC is configured to perform, via the first trained model, a first y-axis correction of the projection of the vehicle trajectory onto the image, and to determine whether the vehicle trajectory passes the first validation check based upon a result of the first y-axis correction, and the second SoC is configured to perform, via the second trained model, a second y-axis correction of the projection of the vehicle trajectory onto the one or more further images, and to determine whether the vehicle trajectory passes the second validation check based upon a result of the second y-axis correction.

Another example (e.g. example 9) relates to a previously-described example (e.g. any combination of examples 1-8), wherein the first camera of the vehicle is from among a first set of first cameras, and wherein the first SoC is configured to determine whether the vehicle trajectory passes the first validation check based upon a projection of the vehicle trajectory onto images acquired by respective ones of the first set of cameras that are different from the second set of cameras.

Another example (e.g. example 10) relates to a previously-described example (e.g. any combination of examples 1-9), wherein the first trained model and/or the second trained model comprises a trained deep neural network (DNN).

An example (e.g. example 11) relates to a method. The method comprises: computing, via a second SoC, a vehicle trajectory to potentially be used for control of a vehicle; transmitting, via the second SoC, vehicle trajectory data comprising the vehicle trajectory to a microcontroller (MCU) and a first SoC; performing, via the first SoC, a first trained model to determine whether the vehicle trajectory passes a first validation check based upon whether points of a projection of the vehicle trajectory onto an image acquired via a first camera of the vehicle remain within a predefined boundary; performing, via the second SoC, a second trained model to determine whether the vehicle trajectory passes a second validation check based upon whether points of a projection of the vehicle trajectory onto respective one or more further images acquired via a set of second cameras of the vehicle that are different from the first camera remain within the predefined boundary; and performing, via the MCU, a third validation check of the vehicle trajectory to selectively enable the vehicle trajectory to be used for control of the vehicle, wherein the third validation check is conditioned upon whether the vehicle trajectory passes the first validation check and the second validation check.

Another example (e.g. example 12) relates to a previously-described example (e.g. example 11), wherein the third validation check comprises validating the vehicle trajectory when the vehicle trajectory passes the first validation check and the second validation check, and otherwise not validating the vehicle trajectory.

Another example (e.g. example 13) relates to a previously-described example (e.g. any combination of examples 11-12), further comprising: transmitting, via the first SoC, first trajectory validation data to the MCU comprising (i) a result of whether the vehicle trajectory passed the first validation check, and (ii) the vehicle trajectory; and transmitting, via the second SoC, second trajectory validation data to the MCU comprising (i) a result of whether the vehicle trajectory passed the second validation check, and (ii) the vehicle trajectory.

Another example (e.g. example 14) relates to a previously-described example (e.g. any combination of examples 11-13), wherein the third validation check further comprises determining whether the vehicle trajectory received from the first SoC and the second SoC as part of the first trajectory validation data and the second trajectory validation data, respectively, match the vehicle trajectory transmitted by the second SoC to the MCU.

Another example (e.g. example 15) relates to a previously-described example (e.g. any combination of examples 11-14), wherein the first camera comprises a front-facing vehicle camera, and wherein the set of second cameras comprise side-facing vehicle cameras.

Another example (e.g. example 16) relates to a previously-described example (e.g. any combination of examples 11-15), the third validation check satisfies Automotive Safety Integrity Level (ASIL) automotive risk classification level D (ASIL-D) requirements.

Another example (e.g. example 17) relates to a previously-described example (e.g. any combination of examples 11-16), wherein: the first validation check comprises determining, via the first trained model, whether each point of the projection of the vehicle trajectory onto the image is within a road edge boundary and an oncoming traffic lane boundary, and the second validation check comprises determining, via the second trained model, whether each point of the projection of the vehicle trajectory onto each respective image of the one or more further images is within the road edge boundary or the oncoming traffic lane boundary.

Another example (e.g. example 18) relates to a previously-described example (e.g. any combination of examples 11-17), wherein a surface identified with navigation of the vehicle is defined as an x-z plane, with a y-axis defining a direction orthogonal to the x-z plane, and further comprising: performing, via the first trained model, a first y-axis correction of the projection of the vehicle trajectory onto the image, and determining whether the vehicle trajectory passes the first validation check based upon a result of the first y-axis correction, and performing, via the second trained model, a second y-axis correction of the projection of the vehicle trajectory onto the one or more further images, and determining whether the vehicle trajectory passes the second validation check based upon a result of the second y-axis correction.

Another example (e.g. example 19) relates to a previously-described example (e.g. any combination of examples 11-18), wherein the first camera of the vehicle is from among a first set of first cameras, and further comprising: determining, via the first SoC, whether the vehicle trajectory passes the first validation check based upon a projection of the vehicle trajectory onto images acquired by respective ones of the first set of cameras that are different from the second set of cameras.

Another example (e.g. example 20) relates to a previously-described example (e.g. any combination of examples 11-19), wherein the first trained model and/or the second trained model comprises a trained deep neural network (DNN).

An apparatus as shown and described.

A method as shown and described.

CONCLUSION

The aforementioned description of the specific aspects will so fully reveal the general nature of the disclosure that others can, by applying knowledge within the skill of the art, readily modify and/or adapt for various applications such specific aspects, without undue experimentation, and without departing from the general concept of the present disclosure. Therefore, such adaptations and modifications are intended to be within the meaning and range of equivalents of the disclosed aspects, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

References in the specification to "one aspect," "an aspect," "an exemplary aspect," etc., indicate that the aspect described may include a particular feature, structure, or characteristic, but every aspect may not necessarily include the particular feature, structure, or characteristic. Moreover, such phrases are not necessarily referring to the same aspect. Further, when a particular feature, structure, or characteristic is described in connection with an aspect, it is submitted that it is within the knowledge of one skilled in the art to affect such feature, structure, or characteristic in connection with other aspects whether or not explicitly described.

The exemplary aspects described herein are provided for illustrative purposes, and are not limiting. Other exemplary aspects are possible, and modifications may be made to the exemplary aspects. Therefore, the specification is not meant to limit the disclosure. Rather, the scope of the disclosure is defined only in accordance with the following claims and their equivalents.

Aspects may be implemented in hardware (e.g., circuits), firmware, software, or any combination thereof. Aspects may also be implemented as instructions stored on a machine-readable medium, which may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others. Further, firmware, software, routines, instructions may be described herein as performing certain actions. However, it should be appreciated that such descriptions are merely for convenience and that such actions in fact results from computing devices, processors, controllers, or other devices executing the firmware, software, routines, instructions, etc. Further, any of the implementation variations may be carried out by a general-purpose computer.

For the purposes of this discussion, the term "processing circuitry" or "processor circuitry" shall be understood to be circuit(s), processor(s), logic, or a combination thereof. For example, a circuit can include an analog circuit, a digital circuit, state machine logic, other structural electronic hardware, or a combination thereof. A processor can include a microprocessor, a digital signal processor (DSP), or other hardware processor. The processor can be "hard-coded" with instructions to perform corresponding function(s) according to aspects described herein. Alternatively, the processor can access an internal and/or external memory to retrieve instructions stored in the memory, which when executed by the processor, perform the corresponding function(s) associated with the processor, and/or one or more functions and/or operations related to the operation of a component having the processor included therein.

In one or more of the exemplary aspects described herein, processing circuitry can include memory that stores data and/or instructions. The memory can be any well-known volatile and/or non-volatile memory, including, for example, read-only memory (ROM), random access memory (RAM), flash memory, a magnetic storage media, an optical disc, erasable programmable read only memory (EPROM), and programmable read only memory (PROM). The memory can be non-removable, removable, or a combination of both.

What is claimed is:

1. A vehicle, comprising:

a microcontroller (MCU);

a first system on a chip (SoC); and a second SoC configured to compute a vehicle trajectory for control of the vehicle, and to transmit vehicle trajectory data comprising the vehicle trajectory to the MCU and the first SoC, wherein the first SoC is configured to execute a first trained model to determine whether the vehicle trajectory passes a first validation check based upon whether points of a projection of the vehicle trajectory onto an image acquired via a first camera of the vehicle remain within a predefined boundary, wherein the second SoC is configured to execute a second trained model to determine whether the vehicle trajectory passes a second validation check based upon whether points of a projection of the vehicle trajectory onto respective one or more further images acquired via a set of second cameras of the vehicle that are different from the first camera remain within the predefined boundary, and wherein the MCU is configured to control the vehicle based on the vehicle trajectory in response to determining that the vehicle trajectory passes a third validation check conditioned upon whether the vehicle trajectory passes both the first validation check and the second validation check.

2. The vehicle of claim 1, wherein the MCU is configured to not validate the vehicle trajectory when the vehicle trajectory does not pass both the first validation check and the second validation check.

3. The vehicle of claim 1, wherein:

the first SoC is configured to transmit first trajectory validation data to the MCU comprising (i) a result of whether the vehicle trajectory passed the first validation check, and (ii) the vehicle trajectory, and the second SoC is configured to transmit second trajectory validation data to the MCU comprising (i) a result of whether the vehicle trajectory passed the second validation check, and (ii) the vehicle trajectory.

4. The vehicle of claim 3, wherein the third validation check is further conditioned upon whether the vehicle trajectory received from the first SoC and the second SoC as part of the first trajectory validation data and the second trajectory validation data, respectively, match the vehicle trajectory transmitted by the second SoC to the MCU.

5. The vehicle of claim 1, wherein the first camera comprises a front-facing vehicle camera, and wherein the set of second cameras comprise side-facing vehicle cameras.

6. The vehicle of claim 1, wherein the third validation check satisfies Automotive Safety Integrity Level (ASIL) automotive risk classification level D (ASIL-D) requirements.

7. The vehicle of claim 1, wherein:

the first SoC is configured to determine whether the vehicle trajectory passes the first validation check by determining, via the first trained model, whether each point of the projection of the vehicle trajectory onto the image is within a road edge boundary and an oncoming traffic lane boundary, and the second SoC is configured to determine whether the vehicle trajectory passes the second validation check by determining, via the second trained model, whether each point of the projection of the vehicle trajectory onto each respective image of the one or more further images is within the road edge boundary or the oncoming traffic lane boundary.

8. The vehicle of claim 1, wherein:

a surface identified with navigation of the vehicle is defined as an x-z plane, with a y-axis defining a direction orthogonal to the x-z plane, the first SoC is configured to perform, via the first trained model, a first y-axis correction of the projection of the vehicle trajectory onto the image, and to determine whether the vehicle trajectory passes the first validation check based upon a result of the first y-axis correction, and the second SoC is configured to perform, via the second trained model, a second y-axis correction of the projection of the vehicle trajectory onto the one or more further images, and to determine whether the vehicle trajectory passes the second validation check based upon a result of the second y-axis correction.

9. The vehicle of claim 1, wherein the first camera of the vehicle is from among a first set of cameras, and wherein the first SoC is configured to determine whether the vehicle trajectory passes the first validation check based upon a projection of the vehicle trajectory onto images acquired by respective ones of the first set of cameras that are different from the set of second cameras.

10. The vehicle of claim 1, wherein the first trained model and/or the second trained model comprises a trained deep neural network (DNN).

11. A method, comprising:

computing, via a second system on a chip (SoC), a vehicle trajectory to potentially be used for control of a vehicle;

transmitting, via the second SoC, vehicle trajectory data comprising the vehicle trajectory to a microcontroller (MCU) and a first SoC;

performing, via the first SoC, a first trained model to determine whether the vehicle trajectory passes a first validation check based upon whether points of a projection of the vehicle trajectory onto an image acquired via a first camera of the vehicle remain within a predefined boundary;

performing, via the second SoC, a second trained model to determine whether the vehicle trajectory passes a second validation check based upon whether points of a projection of the vehicle trajectory onto respective one or more further images acquired via a set of second cameras of the vehicle that are different from the first camera remain within the predefined boundary; and performing, via the MCU, vehicle control based on the vehicle trajectory in response to determining that the vehicle trajectory passes a third validation check;

conditioned upon whether the vehicle trajectory passes both the first validation check and the second validation check.

12. The method of claim 11, wherein the MCU does not validate the vehicle trajectory when the vehicle trajectory does not pass both the first validation check and the second validation check.

13. The method of claim 11, further comprising:

transmitting, via the first SoC, first trajectory validation data to the MCU comprising (i) a result of whether the vehicle trajectory passed the first validation check, and (ii) the vehicle trajectory; and transmitting, via the second SoC, second trajectory validation data to the MCU comprising (i) a result of whether the vehicle trajectory passed the second validation check, and (ii) the vehicle trajectory.

14. The method of claim 13, wherein the third validation check further comprises determining whether the vehicle trajectory received from the first SoC and the second SoC as part of the first trajectory validation data and the second trajectory validation data, respectively, match the vehicle trajectory transmitted by the second SoC to the MCU.

15. The method of claim 11, wherein the first camera comprises a front-facing vehicle camera, and wherein the set of second cameras comprise side-facing vehicle cameras.

16. The method of claim 11, wherein the third validation check satisfies Automotive Safety Integrity Level (ASIL) automotive risk classification level D (ASIL-D) requirements.

17. The method of claim 11, wherein:

the first validation check comprises determining, via the first trained model, whether each point of the projection of the vehicle trajectory onto the image is within a road edge boundary and an oncoming traffic lane boundary, and the second validation check comprises determining, via the second trained model, whether each point of the projection of the vehicle trajectory onto each respective image of the one or more further images is within the road edge boundary or the oncoming traffic lane boundary.

18. The method of claim 11, wherein a surface identified with navigation of the vehicle is defined as an x-z plane, with a y-axis defining a direction orthogonal to the x-z plane, and further comprising:

performing, via the first trained model, a first y-axis correction of the projection of the vehicle trajectory onto the image, and determining whether the vehicle trajectory passes the first validation check based upon a result of the first y-axis correction, and performing, via the second trained model, a second y-axis correction of the projection of the vehicle trajectory onto the one or more further images, and determining whether the vehicle trajectory passes the second validation check based upon a result of the second y-axis correction.

19. The method of claim 11, wherein the first camera of the vehicle is from among a first set of cameras, and further comprising:

determining, via the first SoC, whether the vehicle trajectory passes the first validation check based upon a projection of the vehicle trajectory onto images acquired by respective ones of the first set of cameras that are different from the set of second cameras.

20. The method of claim 11, wherein the first trained model and/or the second trained model comprises a trained deep neural network (DNN).

* * * * *